United States Patent
Chen et al.

(10) Patent No.: US 10,641,091 B2
(45) Date of Patent: May 5, 2020

(54) AUTOMATED DOWNHOLE FLUID CLASSIFICATION USING PRINCIPAL SPECTROSCOPY COMPONENT DATA

(71) Applicant: HALLIBURTON ENERGY SERVICES, INC., Houston, TX (US)

(72) Inventors: Dingding Chen, Tomball, TX (US); Bin Dai, Spring, TX (US); Christopher Michael Jones, Houston, TX (US); John Andrew Quirein, Georgetown, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 313 days.

(21) Appl. No.: 15/557,049

(22) PCT Filed: Nov. 4, 2016

(86) PCT No.: PCT/US2016/060577
§ 371 (c)(1),
(2) Date: Sep. 8, 2017

(87) PCT Pub. No.: WO2018/084852
PCT Pub. Date: May 11, 2018

(65) Prior Publication Data
US 2018/0371905 A1 Dec. 27, 2018

(51) Int. Cl.
*E21B 49/08* (2006.01)
*G01V 11/00* (2006.01)
(Continued)

(52) U.S. Cl.
CPC ............ *E21B 49/08* (2013.01); *G01N 21/31* (2013.01); *G01V 11/002* (2013.01);
(Continued)

(58) Field of Classification Search
CPC ....... E21B 2041/0028; E21B 2049/085; E21B 49/08; G01N 21/31; G01N 2201/1293; G01N 2201/1296; G01V 11/002
(Continued)

(56) References Cited

U.S. PATENT DOCUMENTS

| | | |
|---|---|---|
| 5,706,194 A | 1/1998 | Neff et al. |
| 6,236,943 B1 * | 5/2001 | Aminzadeh ............... G01V 1/32 702/14 |

(Continued)

OTHER PUBLICATIONS

Korean Intellectual Property Office, International Search Report and Written Opinion, dated Jul. 26, 2017, 16 pages, Korea.

*Primary Examiner* — John H Le

(57) ABSTRACT

System and methods for downhole fluid classification are provided. Measurements are obtained from one or more downhole sensors located along a current section of wellbore within a subsurface formation. The measurements obtained from the one or more downhole sensors are transformed into principal spectroscopy component (PSC) data. One or more fluid types are identified for the current section of the wellbore within the subsurface formation, based on the PSC data and a fluid classification model. The fluid classification model is refined for one or more subsequent sections of the wellbore within the subsurface formation, based at least partly on the one or more fluid types identified for the current section of the wellbore.

20 Claims, 14 Drawing Sheets

(51) Int. Cl.
*G01N 21/31* (2006.01)
*E21B 41/00* (2006.01)

(52) U.S. Cl.
CPC . *E21B 2041/0028* (2013.01); *E21B 2049/085* (2013.01); *G01N 2201/1293* (2013.01); *G01N 2201/1296* (2013.01)

(58) Field of Classification Search
USPC .......... 702/6, 11, 8, 14, 16; 166/250.01, 53; 706/8, 20
See application file for complete search history.

(56) References Cited

U.S. PATENT DOCUMENTS

| | | | |
|---|---|---|---|
| 8,374,974 B2 | 2/2013 | Chen et al. | |
| 9,519,865 B2 | 12/2016 | Quirein et al. | |
| 2007/0108378 A1 | 5/2007 | Terabayashi et al. | |
| 2010/0177310 A1 | 7/2010 | Difoggio | |
| 2014/0114892 A1* | 4/2014 | Quirein | E21B 47/0005 706/20 |
| 2014/0121973 A1* | 5/2014 | Buchanan | G05B 23/0221 702/6 |
| 2015/0205000 A1 | 7/2015 | Perkins et al. | |
| 2015/0292324 A1* | 10/2015 | Jackson | E21B 49/08 166/250.01 |

* cited by examiner

AUTOMATED DOWNHOLE FLUID CLASSIFICATION USING PRINCIPAL SPECTROSCOPY COMPONENT DATA

CROSS-REFERENCE TO RELATED APPLICATIONS

This application is a U.S. National Stage patent application of International Patent Application No. PCT/US2016/060577, filed on Nov. 4, 2016, the benefit of which is claimed and the disclosure of which is incorporated herein by reference in its entirety.

FIELD OF THE DISCLOSURE

The present disclosure relates generally to fluid analysis in hydrocarbon recovery operations, and particularly to identification of fluids within subsurface hydrocarbon bearing formations using downhole optical sensors.

BACKGROUND

Fluid classification is essential to downhole fluid analysis and is often the first step in workflows for quantitative fluid characterization during formation sampling and testing. Conventional fluid classifiers deployed in formation testers generally use physical bulk fluid properties and compositional measurement data to classify different types of downhole fluids. The compositional data used for the classification is based on measurements from downhole optical sensors, which may require complex calibration to ensure data reliability. However, the complexity of sensor-based calibration is often difficult to manage given the number of permutations of physical and chemical properties that are typically measured for fluid classification purposes. Further, the accuracy of fluid classifications that are directly based on sensor measurements may be limited by the sensitivity of the optical sensors used to detect the different fluid types downhole. For example, the optical sensors of a conventional fluid classifier may be overly sensitive to certain parameters that cause noisy data in real-world systems. While the use of multiple sensors from various downhole tools may improve the quality of the fluid classification, the availability of useful sensor data and the costs of sensor calibration may limit or discourage the use of such a multi-disciplinary approach in many oilfield applications.

DESCRIPTION OF ILLUSTRATIVE EMBODIMENTS

Figure 1A:
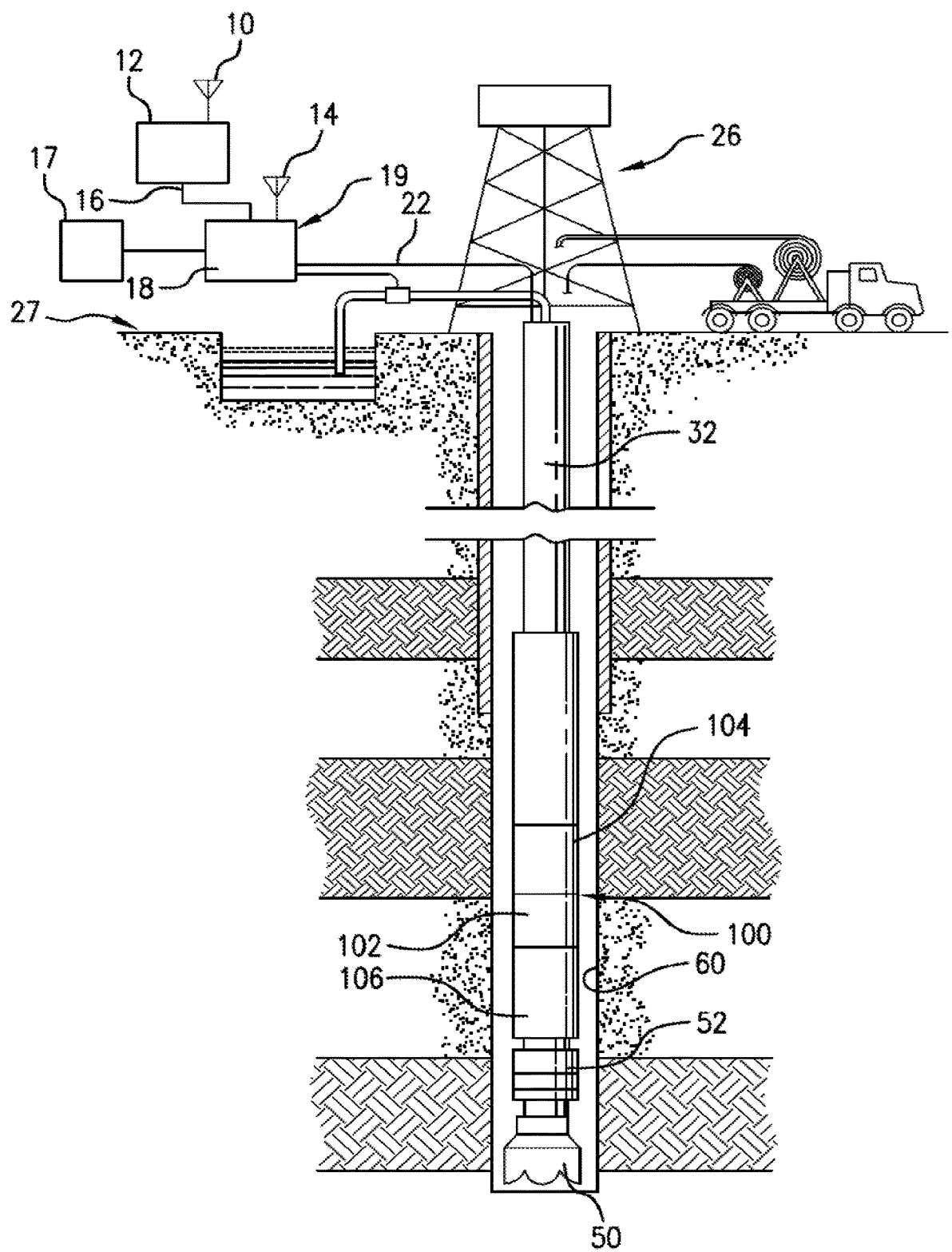
FIG. 1A is a diagram of an illustrative well system in which a downhole fluid classifier may be used for fluid analysis and classification based on principal spectroscopy component (PSC) data obtained through optical sensor data transformation during wellsite operations.

Embodiments of the present disclosure relate to downhole fluid analysis and classification based on principal spectroscopy component (PSC) data. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily retelling to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Embodiments of the present disclosure may be used to identify different types of downhole fluids based on PSC data. Examples of different fluid types that may be identified include, but are not limited to, oils (e.g., heavy, medium, light and volatile oils), condensates and gases, formation water, mud filtrate, and mixtures. In one or more embodiments, the PSC data used for the downhole fluid classification techniques disclosed herein may be derived from measurements obtained from one or more downhole optical sensors. For example, raw measurements obtained from the optical sensors may be transformed into PSC data and then provided as inputs to a downhole fluid classifier. As will be described in further detail below, such a PSC-based fluid classifier may use unsupervised clustering analysis or supervised machine learning or a combination of both to classify downhole fluids along different sections of a wellbore within a subsurface hydrocarbon bearing formation. As the PSC input data used for the fluid classification is independent of the sensor type or original sensor data, such a PSC-based fluid classifier may be used without having to perform the sensor-based calibration that is typically associated with conventional fluid classification systems. Also, in contrast to conventional optical fluid classification techniques, which rely on sensor-based narrow-band or broadband filter selection, the disclosed PSC-based classification techniques enable the use of a universal, data-independent downhole fluid classifier. Accordingly, the disclosed PSC-based fluid classifier may be capable of handling multivariate data inputs from sensors with different configurations over a wide wavelength range.

Illustrative embodiments and related methodologies of the present disclosure are described below in reference to FIGS. 1A-13 as they might be employed, for example, in a computer system for downhole fluid classification and analysis based on PSC data. In some implementations, such a computer system may be incorporated within a downhole fluid analysis tool including a fluid classifier and neural network converter for converting optical sensor measurements into PSC data, as will be described in further detail below. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1A is a diagram of an illustrative well system for downhole fluid classification using PSC data. As shown in FIG. 1A, the well system includes a drill string 32 that extends from a chilling rig 26 into a wellbore 60 within a subsurface hydrocarbon bearing formation. Drilling rig 26 may include equipment for raising and towering casing, drill pipe, coiled tubing, production tubing, other types of pipe or tubing strings or other types of conveyance vehicles, e.g., wireline or slickline, for performing various downhole operations at the wellsite. Such operations may include, but are not limited to, drilling, production, and stimulation operations performed along different sections of wellbore 60. Also, as shown in FIG. 1A, drill string 32 includes a drill bit 50, one or more optical sensors 52 coupled to a downhole tool 100. In one or more embodiments, downhole tool 100 may be a pump-out formation tester including a pump assembly to pump fluid samples out of the formation for testing and analysis. While not shown in FIG. 1A, it should be appreciated that drill string 32 may include other types of sensors in addition to optical sensors 52. Examples of such other sensors include, but are not limited to, density sensors for measuring fluid density and location sensors for determining the relative location or position, direction, and azimuthal orientation of drill bit 50 or drill string 32 within wellbore 60 and the subsurface formation during downhole operations.

In one or more embodiments, optical sensors 52 and other sensors of drill string 32 may be used to detect and measure formation characteristics along wellbore 60 at any desired depth or location within the subsurface formation. For example, optical sensors 52 and other sensor's may be used to measure fluid characteristics near drill bit 50 as well as other environmental parameters within the formation surrounding drill bit 50. Such environmental parameters may include, but are not limited to, pressure, temperature, and volume of fluids. However, it should be appreciated that the disclosed embodiments are not intended to be limited thereto and that, while optical sensors 52 are shown above drill bit 50 in FIG. 1A, optical sensors 52 may be positioned at any location along drill string 32. For example, in some implementations, optical sensors 52 along the internal or external surfaces of downhole tool 100.

In one or more embodiments, optical sensors 52 may include one or more integrated computational element (ICE) cores for detecting particular chemical compositions or properties of formation fluids. Such an ICE core may use electromagnetic radiation emitted from a light source to optically interact with a sample of fluid to determine one or more sample characteristics of the fluid. The sample may be of a multiphase wellbore fluid (comprising oil, gas, water, and solids, for example), for which a variety of fluid properties may be detected. Examples of such properties include, but are not limited to, C1-C5 hydrocarbon concentration, gas/oil ratio (GOR), SARA (saturates, aromatics, resins, and asphaltenes) concentration, CO2, H2O, synthetic drilling fluid (SDF) concentration, and specific gravity.

In one or more embodiments, measurements collected by optical sensors 52 and oilier sensors for a current section of wellbore 60 within the subsurface formation may be used by downhole tool 100 for real-time processing and qualitative and/or quantitative fluid analysis downhole. The current section of wellbore 60 may correspond to, for example, a current position of drill bit 50 within wellbore 60, e.g., as determined using location sensor measurements. As will be described in further detail below, the results of the fluid analysis performed by downhole tool 100 may be used to make real-time operational decisions related to the downhole operation being performed, e.g., making adjustments to a current path of wellbore 60 through the subsurface formation during a drilling operation. However, it should be appreciated that the techniques disclosed herein are not intended to be limited to drilling operations and that these techniques may be applied to other types of downhole operations.

As shown in the example of FIG. 1A, downhole tool 100 includes a data converter 102, a fluid classifier 104, and a control unit 106. In one or more embodiments, data converter 102 may convert or transform the measurements obtained from optical sensors 52 to PSC data for use by fluid classifier 104. For example, data converter 102 may transform the raw optical signals of one or more ICE cores of optical sensors 52 from a sensor parameter space associated with optical sensors 52 to a PSC parameter space associated with fluid classifier 104. The PSC data resulting from the transformed ICE data may then be provided as inputs to fluid classifier 104. Measurements from other non-optical sensors, e.g., fluid density data from density sensors coupled to drill string 32, may be provided as additional inputs directly to fluid classifier 104, without any conversion or transformation by data converter 102. In one or more embodiments, data converter 102 may be a neural network converter that uses one or more neural networks to perform the data transformation. As will be described in further detail below, such a neural network converter may use, for example, a neural network ensemble created from a plurality of neural networks, which have been combined to produce a desired output.

In one or more embodiments, fluid classifier 104 may use the PSC data from data converter 102 to identify one or more fluid types for the current section of wellbore 60 within the subsurface formation. As will be described in further detail below, the PSC data transformation performed by data converter 102 allows the inputs provided to fluid classifier 104 from different types of sensors to be standardized regardless of the particular sensor configuration or element design. Tins in turn may allow fluid classifier 104 to be used in downhole fluid analysis tools as a universal fluid classifier that operates independently from the type of sensor or sensor data that is used.

In one or more embodiments, downhole tool 100 may include a fluid composition analyzer (not shown) and control unit 106 of downhole tool 100 may use information obtained from the fluid composition analyzer to refine the output of fluid classifier 104 for the current and/or subsequent sections of wellbore 60. In one or more embodiments, such information may be used along with the identified fluid types to refine a fluid classification model, which may be used by fluid classifier 104 to perform unsupervised clustering analysis or supervised machine learning, as will be described in further detail below. Control unit 106 may include, for example, a signal processor (not shown), a communications interface (not shown) and other circuitry necessary to achieve the objectives of the present disclosure, as would be understood by those of ordinary skill in the relevant art having the benefit of this disclosure. In one or more embodiments, control unit 106 may use the signal processor to send control signals via the communications interface to other components of drill string 32 for purposes of controlling or making appropriate adjustments to the downhole operation being performed. The particular adjustments may be based on the fluid types identified by fluid classifier 104 for the current section of wellbore 60. For example, such control signals may be used to control or adjust the path of wellbore 60 for subsequent wellbore sections to be drilled within the subsurface formation during a drilling operation. Control unit 106 in this example may send appropriate control signals to a downhole motor assembly (not shown) for purposes of controlling the direction or orientation of drill bit 50 according to the adjusted path of wellbore 60. The adjusted path may be one that has been determined to be more optimal for hydrocarbon recovery based on the identified fluid types (or fluid profile) of the formation.

In one or more embodiments, control unit 106 may also transmit the fluid types identified by fluid classifier 104 to a surface processing unit 19 located at a surface 27 of the wellsite. As shown in FIG. 1A, surface processing unit 19 may include a computing device 18 communicatively coupled to the components of drill string 32, including downhole tool 100 and optical sensors 52, via a communication path 22. Computing device 18 may store the fluid types in a local memory or data store 17. Additionally or alternatively, computing device 18 may send the fluid types to another computing device of a data processing unit 12 via, for example, a wired connection 16 or a wireless connection established between transceivers 14 and 10 of surface processing units 19 and 12, respectively. Data processing unit 12 may be, for example, a remote data storage or database system including a database server that is communicatively coupled to computing device 18 via a communication network. Such a communication network may be, for example, a local-area network, a medium-area network or a wide-area network, e.g., the Internet. The computing devices of data processing units 12 and 19 may be implemented using any type of computing device, an example of which will be described in further detail below with respect to FIG. 14.

Although only data converter 102, fluid classifier 104, and control unit 106 are shown in FIG. 1A, it should be appreciated that downhole tool 100 may include additional components, modules, and/or sub-components as desired for a particular implementation. It should also be appreciated that data converter 102, fluid classifier 104, and control unit 106 may be implemented in software, firmware, hardware, or any combination thereof. Furthermore, it should be appreciated that embodiments of data converter 102, fluid classifier 104, and control unit 106, or portions thereof, can be implemented to ran on any type of processing device including, but not limited to, a computer, workstation, embedded system, networked device, mobile device, or other type of processor or computer system capable of carrying out the functionality described herein.

In some implementations, the data transformation and fluid classification functions performed by data converter 102 and fluid classifier 104, respectively, as well as the control functions performed by control unit 106 of downhole tool 100, as described above, may be performed by computing device 18 at the surface. For example, the downhole measurements collected by optical sensors 52 and other sensors of drill string 32 may be transmitted to computing device 18 via communication path 22. In some cases, optical sensors 52 may include a signal processing apparatus for transmitting the downhole measurements as signals directly to computing device 18 via communication path 22 along drill string 32.

As described above, embodiments of the present disclosure may be applied to any of various downhole operations. Thus, while the example in FIG. 1A was described in the context of drill string 32 or a drilling assembly, it should be appreciated that the disclosed embodiments may be implemented using other types of downhole assemblies or tubular strings. For example, optical sensors 52 and downhole tool 100 may be deployed within wellbore 60 as part of a wireline assembly, as will be described in further detail below with respect to FIG. 1B.

Figure 1B:
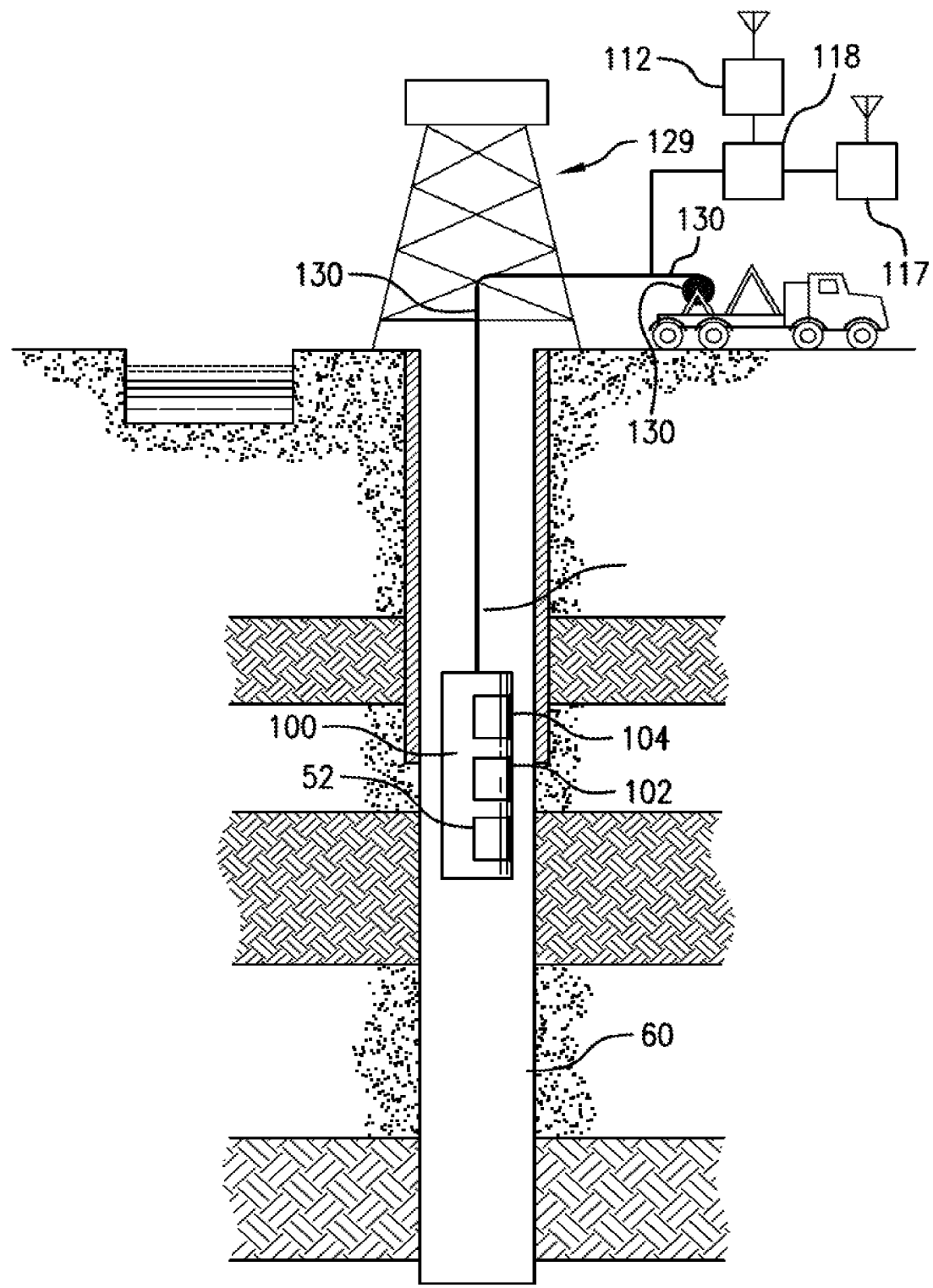
FIG. 1B is a diagram of an illustrative wireline system for a PSC based downhole fluid classifier.

FIG. 1B is a diagram of an illustrative wireline system for a PSC based downhole fluid classifier. As illustrated in FIG. 1B, downhole tool 100 may be employed with "wireline" systems in order to carry out logging or other operations. For example, instead of using the drill string 32 of FIG. 1A to deploy downhole tool 100 within wellbore 60, downhole tool 100 may be lowered into wellbore 60 by a wireline conveyance 130, as shown in FIG. 1B. As in FIG. 1A, downhole tool 100 includes a data converter 102 and fluid classifier 104. Downhole tool 100 as shown in FIG. 1B also incorporates optical sensors 52 and other non-optical sensors (not shown).

Wireline conveyance 130 as shown in FIG. 1B can be anchored in the drill rig 129 or portable means such as a truck. Wireline conveyance 130 can be one or more wires, slickline, cables, or the like, as well as tabular conveyances such as coiled tubing, joint tubing, or other tubulars. Wireline conveyance 130 may provide support for downhole tool 100 and also, enable communications between the tool and a surface processing unit 118 at the surface. In the example of FIG. 1B, a computing device of surface processing unit 118 may perform the functions performed by control unit 106 of downhole tool 100 as described above with respect to FIG. 1A. Wireline conveyance 130 may include fiber optic cabling for carrying out communications. Additionally, power may be supplied via wireline conveyance 130 to meet power requirements of downhole tool 100 and its components. For slickline or coiled tubing configurations, power can be supplied downhole with a battery or via a downhole generator.

It should be noted that while FIGS. 1A and 1B generally depict a land-based or onshore operation, the techniques described herein are also applicable to offshore operations that employ floating or sea-based platforms and rigs, without departing from the scope of the disclosure. Also, while FIGS. 1A and 1B depict vertical wellbores, the present disclosure is equally well-suited for use in wellbores having other orientations, including horizontal wellbores, slanted wellbores, multilateral wellbores or the like. Further, while wellbore 60 is depicted in FIGS. 1A and 1B as a cased hole, it should be appreciated that downhole tool 100 may be equally well suited for use in open hole operations. Additional details relating to the real-time data processing and fluid classification techniques disclosed herein, e.g., as performed by downhole tool 100 of FIGS. 1A and 1B, will now be described using FIGS. 2-14.

Figure 2:
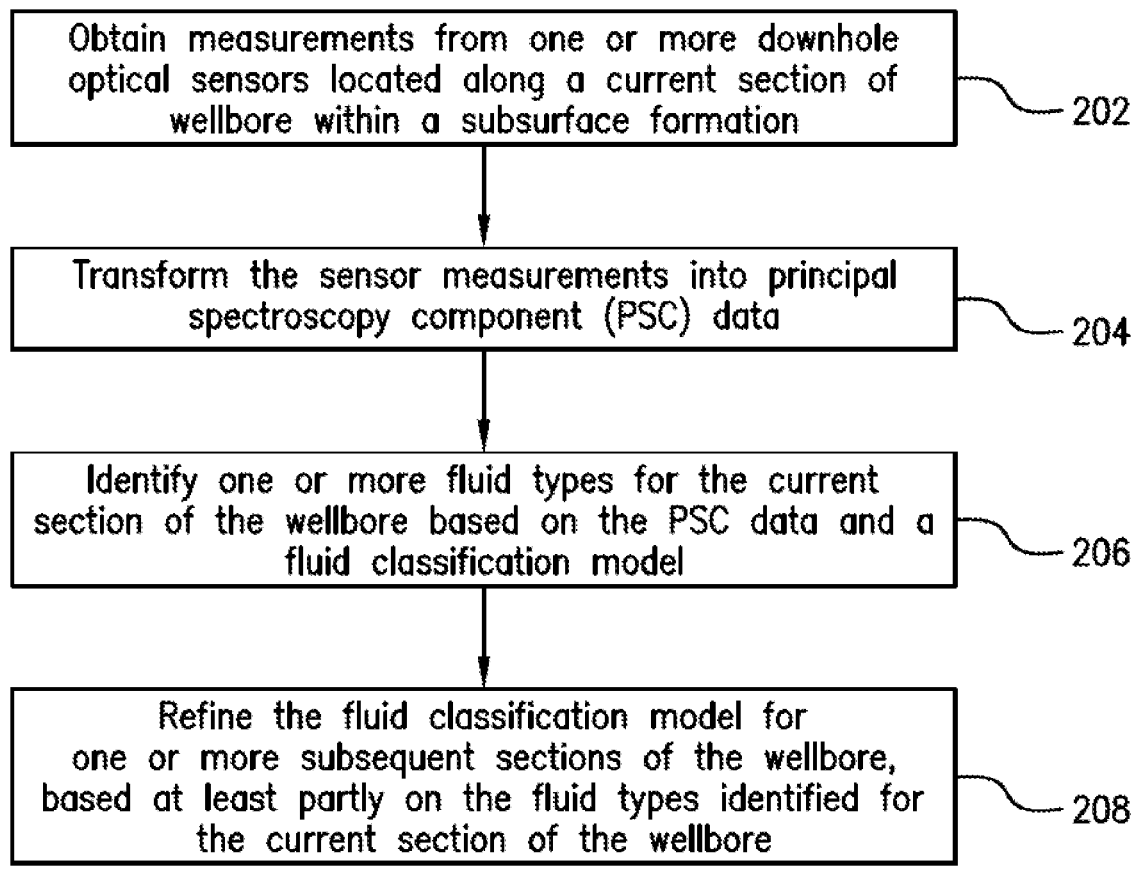
FIG. 2 is a flowchart of an illustrative process for fluid analysis using a PSC based downhole fluid classifier.

FIG. 2 is a flowchart of an illustrative process 200 for fluid analysis using a PSC based downhole fluid classifier. For discussion purposes, process 200 will be described using downhole tool 100 of FIGS. 1A and 1B, as described above. However, process 200 is not intended to be limited thereto. As shown in FIG. 2, process 200 begins in block 202, which includes obtaining measurements from one or more downhole sensors located along a current section of wellbore within a subsurface formation. The downhole sensors may include, for example, one or more optical sensors, e.g., optical sensors 52 of FIG. 1A, as described above, and other non-optical sensors, e.g., fluid density sensors, as described above. The measurements may be obtained from the sensors by a downhole fluid analysis tool, e.g., downhole tool 100 of FIG. 1A, as described above. The measurements obtained from the optical sensors may include, for example, ICE data collected by one or more ICE cores of the one or more optical sensors.

In block 204, the sensor measurements obtained in block 202 may be transformed into PSC data for processing by a fluid classifier, e.g., fluid classifier 104 of FIG. 1A, as described above. In one or more embodiments, the measurements from the optical sensors and other sensors may be preprocessed prior to the transformation. The preprocessing performed on such sensor data may include, for example, optical sensor data baseline correction, neutral density-normalization and neural network calibration scaling according to any of various well-known techniques for performing each type of preprocessing. In one or more embodiments, the transformation of ICE data from the optical sensors to PSC data may be performed in block 204 using a neural network converter, e.g., data converter 102 of FIG. 1A, as described above. For example, the ICE data may be applied as multiple inputs to the neural network converter, which then transforms the data into multiple outputs of PSC data, as shown in FIG. 3.

Figure 3:
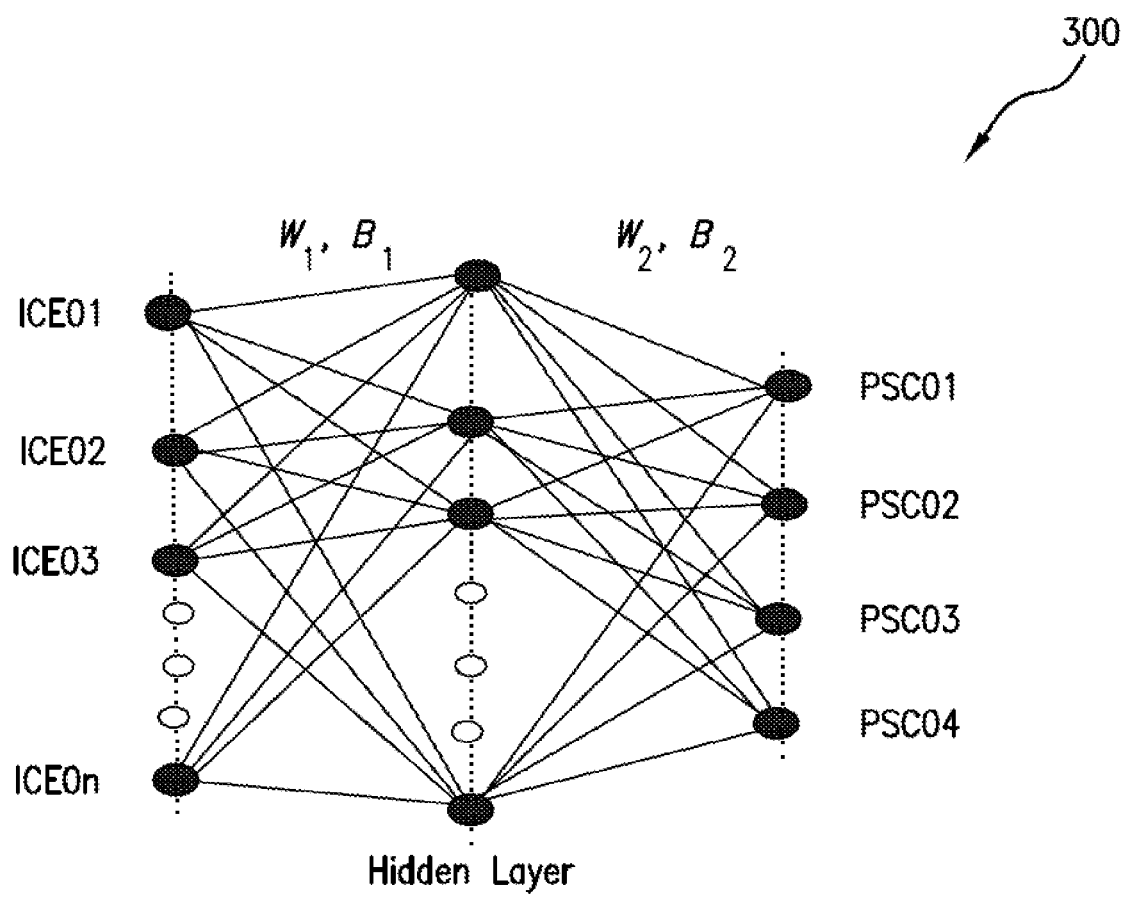
FIG. 3 is a diagram of an illustrative structure of a multi-input and multi-output (MIMO) neural network converter.

FIG. 3 is a diagram of an illustrative multi-input and multi-output (MIMO) structure of a neural network converter 300. As shown in FIG. 3, neural network converter 300 may include multiple layers of neural network nodes (or "neurons"). The layers of neural network converter 300 may include an input layer, a hidden layer, and an output layer. The number of input nodes of the input layer of neural network converter 300 may depend on the number of sensing elements in a particular sensor configuration. Thus, for the example in FIG. 3, the number of input nodes of neural network converter 300 may correspond to a number of ICE cores from ICE01 to ICE0n of the optical sensor used to acquire the measurements being transformed.

In one or more embodiments, neural network converter 300 may perform the data transformation using a nonlinear transfer function for each hidden neuron of the hidden layer and a linear transfer function for each output neuron of the output layer. While only one hidden layer is shown in FIG. 3, it should be noted that neural network converter 300 may include additional hidden layers as desired for a particular implementation. In one or more embodiments, the nonlinear transfer function may be a hyperbolic tangent sigmoid function. For the MIMO structure of neural network converter 300 as shown in FIG. 3, the neuron output for the hidden and output layers may be calculated using Equations (1) and (2), respectively.

$$a_1 = f_1(n_1) = \frac{e^{n_1} - e^{-n_1}}{e^{n_1} + e^{-n_1}}, n_1 = W_1 \times P + B_1 \tag{1}$$

$$a_2 = n_2, n_2 = W_2 \times a_1 + B_2 \tag{2}$$

where $a_1$ is the hidden layer output, $a_2$ is the output layer output, $n_1$ and $n_2$ are neuron inputs to the hidden layer and output layer, and $W_1, B_1, W_2, B_2$ are parameters representing connection coefficients of neural network converter 300, which may be optimized through training during a calibration of neural network converter 300.

In one or more embodiments, multiple neural networks may be used to construct a neural network ensemble (NNE), where each member neural network may be configured with a different number of neurons in its hidden layer or calibrated with a different number of inputs in its input layer. The calibration may be performed using machine learning to minimize the difference between the output of neural network converter 300 (or NNE thereof) and target PSC values used for training neural network converter 300 during calibration. Such training target data may be calculated from a full or selected range of fluid transmittance spectroscopy measurements stored in a database of optical PVT (pressure, volume, and temperature) laboratory data. For example, such an optical-PVT database may include PSC data generated from applying any of various principal component analysis (PCA) techniques to laboratory measurements of fluid spectroscopies over a full or selected wavelength range or ranges. Such spectroscopy measurements may be obtained using one or more high-resolution laboratory spectrometers. The PSC data for different types of fluids may also be stored in the optical-PVT database for later access and retrieval for purposes of calibrating neural network converter 300. For example, neural network converter 300 may access such a database to retrieve data for a selected number of reference fluids that may be representative of the types of fluids expected within the formation. Examples of such formation fluids include, but are not limited to, oils, water, nitrogen gas, hydrocarbon gas and condensates. The selected reference fluids may also include some non-reservoir fluids including, for example and without, limitation, toluene, dodecane and pentanediol. The addition of such non-reservoir reference fluids may be used to improve the diversity of downhole fluid patterns that may be included within the ICE input data and fill any gaps in the calibration data range.

Figure 4A:
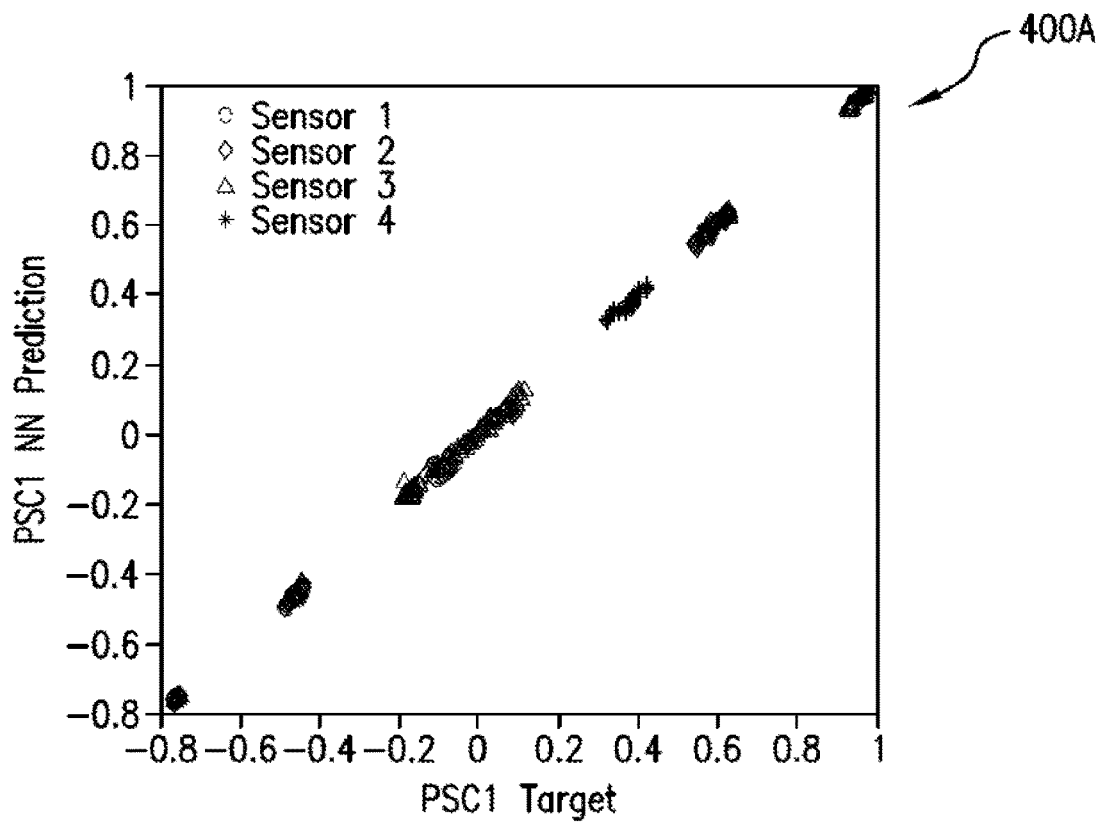
FIGS. 4A and 4B are plot graphs of illustrative calibration results for four optical sensors based on the ICE to PSC data conversion.
Figure 4B:
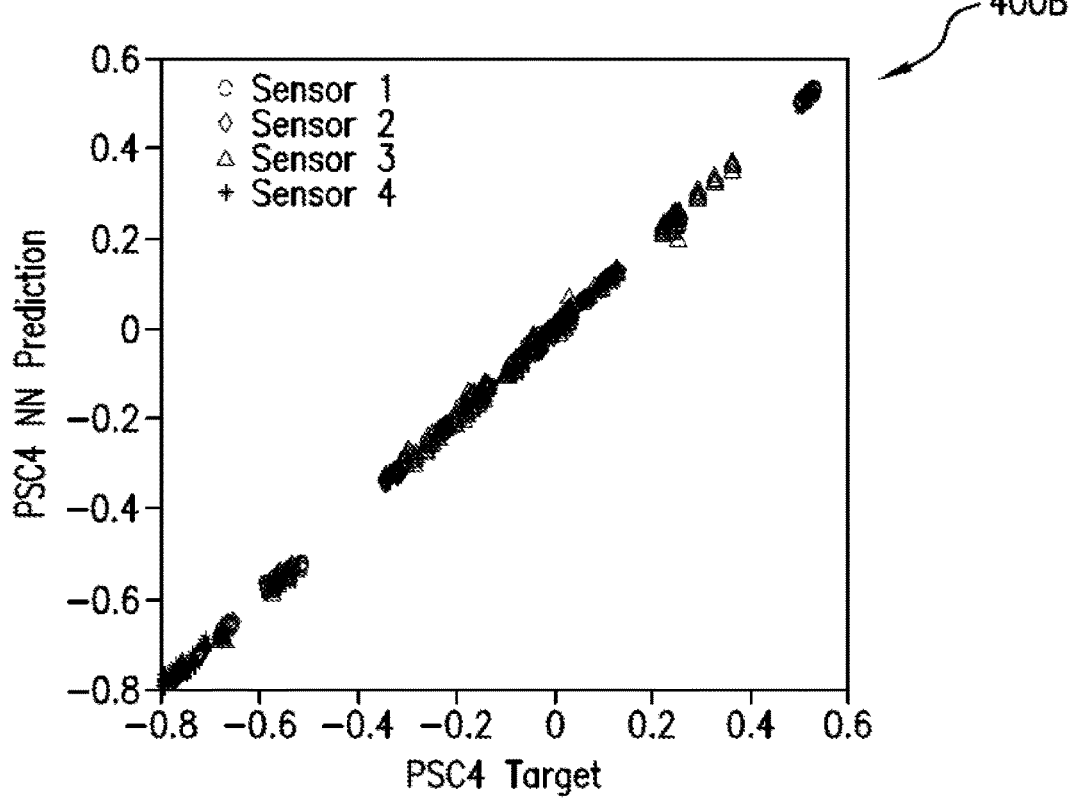

FIGS. 4A and 4B are cross-plots illustrating the results of different calibration on the conversion by a neural network (NN) converter of ICE data to PSC data. The PSC data output by the NN converter in this example may be a prediction of the PSC data expected for a given set of ICE data inputs from each of four optical sensors. In both FIGS. 4A and 4B, the PSC data predicted by the NN converter is plotted against a training target for the PSC data expected from the optical sensor measurements in this example. However, a cross-plot 400A in FIG. 4A shows a set of PSC data corresponding to a first principal spectroscopy component (PSC1) predicted by the NN converter in this example relative to the target PSC data for four differently calibrated optical sensors. For example, the ICE data inputs for each sensor may have been calibrated using a different number of reference fluids, e.g., 13 reference fluids for sensor 1, 10 for sensor 2, 12 for sensor 3, and 9 for sensor 4. By contrast, a cross-plot 400B in FIG. 4B shows, with a similar quality in calibration accuracy, another set of predicted PSC data corresponding to a fourth principal spectroscopy component (PSC4) against training target data for the same four sensors after they have been calibrated in the same way, e.g., by using the same number of reference fluids. To further improve fluid classification during downhole operations in the field, the above-described ICE to PSC data convertor may also be calibrated on a pool of sensors having the same configuration, which may improve the converter's tolerance to any noisy data that may be present in the sensor measurements.

Referring back to FIG. 2, once the optical sensor measurements (e.g., ICE data) have been transformed into PSC data in block 204, process 200 proceeds to block 206, which includes using the PSC data and a fluid classification model to identify one or more fluid types for the current section of the wellbore for which the measurements were obtained (in block 202). In one or more embodiments, the PSC data may be applied as inputs to the fluid classification model of a fluid classifier, e.g., fluid classifier 104 of FIG. 1A, as described above. The PSC input data provided to the fluid classifier may be in a standardized PSC data format that enables the fluid classifier to perform the fluid type identification independently from the particular type of sensor or sensor data. In one or more embodiments, the fluid classification model in block 206 may be used to perform unsupervised clustering analysis to identify the one or more fluid types from the applied PSC data, as will be described in further detail below with respect to FIGS. 5-8. Alternatively, the fluid classification model may be an adaptive neuron-fuzzy inference system (ANFIS) model for identifying the one or more fluid types using supervised machine learning, as will be described in further detail below with respect to FIGS. 9-11.

FIGS. 5-8 will be used to describe an example of applying unsupervised clustering to fluid PSC data and density data. For purposes of this example, it is assumed that the PSC inputs for fluid clustering analysis includes high-resolution transmittance spectroscopy data over the range of 1200-3350 nanometers (nm) as measured for approximately 250 fluids (3900 spectra). The spectroscopy data for the fluids may be retrieved from a fluids database, e.g., an optical-PVT database, as described above. The retrieved data may then be processed using any of various principal component analysis (PCA) techniques to obtain PSC data.

Figure 5:
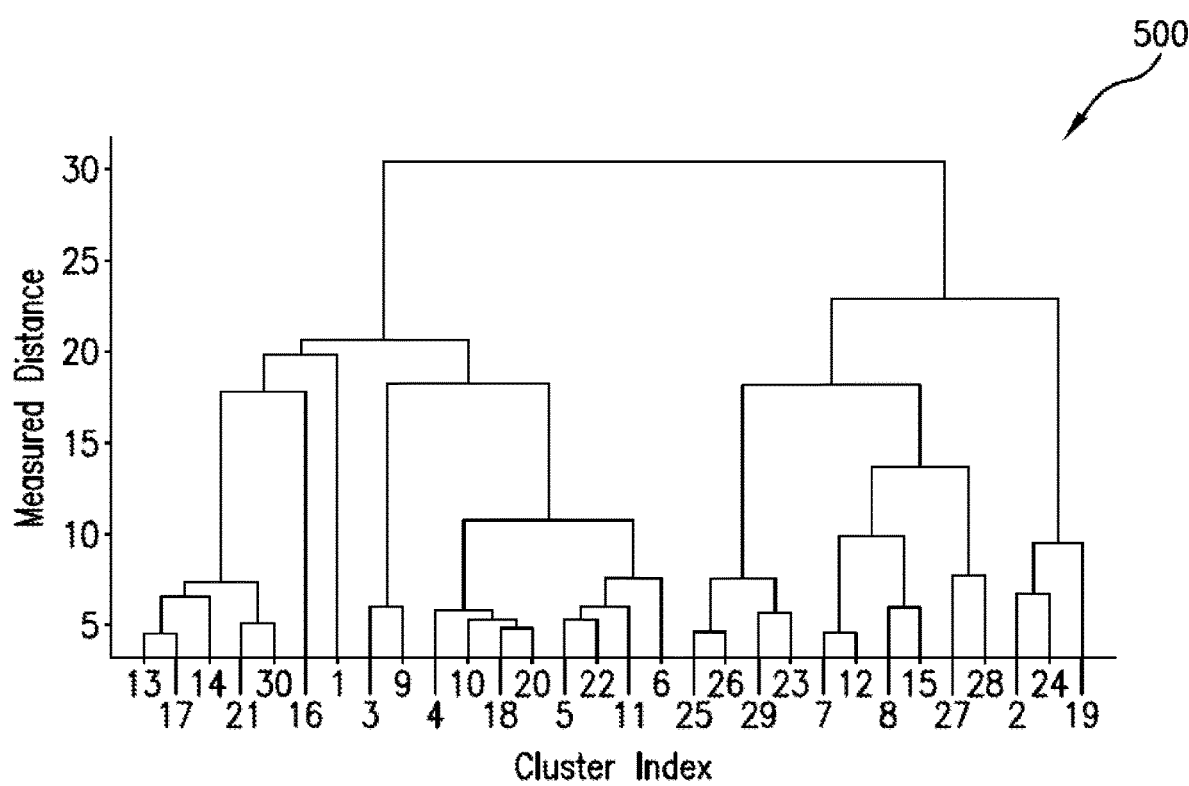
FIG. 5 is a dendrogram showing unsupervised fluid clustering results based on PSC inputs and density data.

In this example, the data for the top nine PSC inputs that capture 97.8% of the spectroscopy data variations may be combined with fluid density data available in the database to form ten-dimensional clustering inputs. Any of various unsupervised clustering analysis techniques may be used for this purpose to separate the unlabeled given data set into a finite and discrete set of subgroups, such that the similarity between objects within a subgroup is larger than the similarity between objects belonging to different subgroups. A Euclidean distance based clustering may be used in this example to measure the degree of similarity between objects for each fluid type and dissimilarity between the fluid types in the clusters, e.g., using a normalized scale (from −1 to +1 for each input). The clusters may be generated using, for example, any of various cluster linkage algorithms including group average linkage, median linkage, centroid linkage and Ward's method. In this example, a set of 30 clusters may be generated with the use of Ward's method or other linkage algorithm for producing minimal within-category and maximum between-category variance clusters that are more robust for PSC data and are, hence less sensitive to noise and outliers. The clusters may be organized in a hierarchical tree structure or "dendrogram," as shown in FIG. 5. However, it should be appreciated that embodiments are not intended to be limited thereto and the clusters may be generated using a self-organized-feature-map (SOFM) of the fluid type clusters or other clustering technique using various distance-based measurements.

FIG. 5 is a dendrogram 500 showing unsupervised fluid clustering results based on PSC inputs and density data. The measured distance along the y-axis of dendrogram 500 may be a relative distance between the leaves, branches and roots of dendrogram 500 and may represent the relative similarity or dissimilarity between the corresponding clusters. It should be noted that the cluster number's 1 to 30 in dendrogram 500 are not necessarily representative of the similarity between the different numbered clusters. Rather, the number assigned to each cluster may represent that cluster's position in a data sequence used to organize the clusters during clustering analysis. The cluster index along the x-axis of dendrogram 500 may be used to group different types of fluids. For example, dendrogram 500 may be used to organize fluid types by cluster index from the left-hand side to the right-hand side of the x-axis into the following groups: heavy to medium oil, medium to light oil, light oil to condensates, and condensates to gas into different clusters as expected.

Some non-reservoir fluids in the fluids database and any fluids for which there may be a relatively high degree of uncertainty from spectroscopy measurements and hence, PSC data may also be separated into different clusters. For example, the fluid types in clusters 13, 17 and 14 may be grouped as similar types of heavy and medium oils (HMO). Cluster 1 may include all fresh water and salt water samples (WAT). Water samples are generally very different from oil samples in terms of PSC. However, the density of water may be very similar to heavy oil. Clusters 5, 22, 11 and 6 may be medium and light oils (MLO). Clusters 4, 10 18 and 20 may be representative of non-reservoir fluids. Cluster 4 may be synthetic drilling fluid (SDF), e.g., SDF composed primarily of accolade. Cluster 18 may be silicone oil, and cluster 20 may include fluid pentanediol. There may be a relatively smaller variation in PSC data patterns between the non-reservoir fluids within each group. However, such non-reservoir fluids may be quite different in comparison to the reservoir fluids in adjacent clusters 5, 22, 11 and 6. In the second half of dendrogram 500, clusters 25, 26, 29 and 23 may be examples of condensates and hydrocarbon gas (CGS). Clusters 7, 12, 8, 15, 27 and 28 may be interpreted as light oil end condensates (LOC). Clusters 2, 24 and 19 may be samples of nitrogen (NIT) and Carbon-dioxide ($CO_2$).

Figure 6:
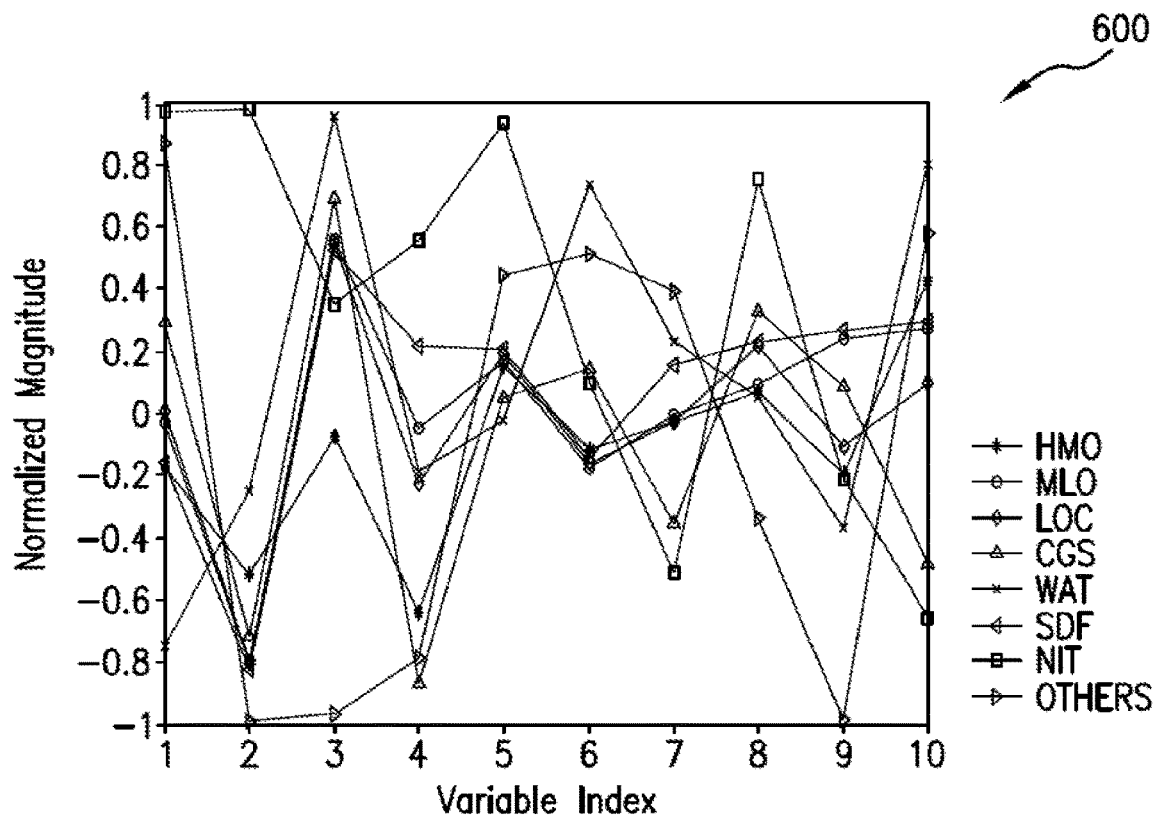
FIG. 6 is a plot graph of illustrative fluid types based on ten clustering inputs.

FIG. 6 is a plot graph 600 of illustrative fluid types identified using unsupervised clustering based on ten clustering inputs (e.g., PSC1 to PSC9 and fluid density) and fluid patterns of HMO, MLO, LOC, CGS, WAT, SDF, NIT and OTHERS, e.g., some non-reservoir fluids and fluids with high uncertainty in measurements, as described above.

Figure 7:
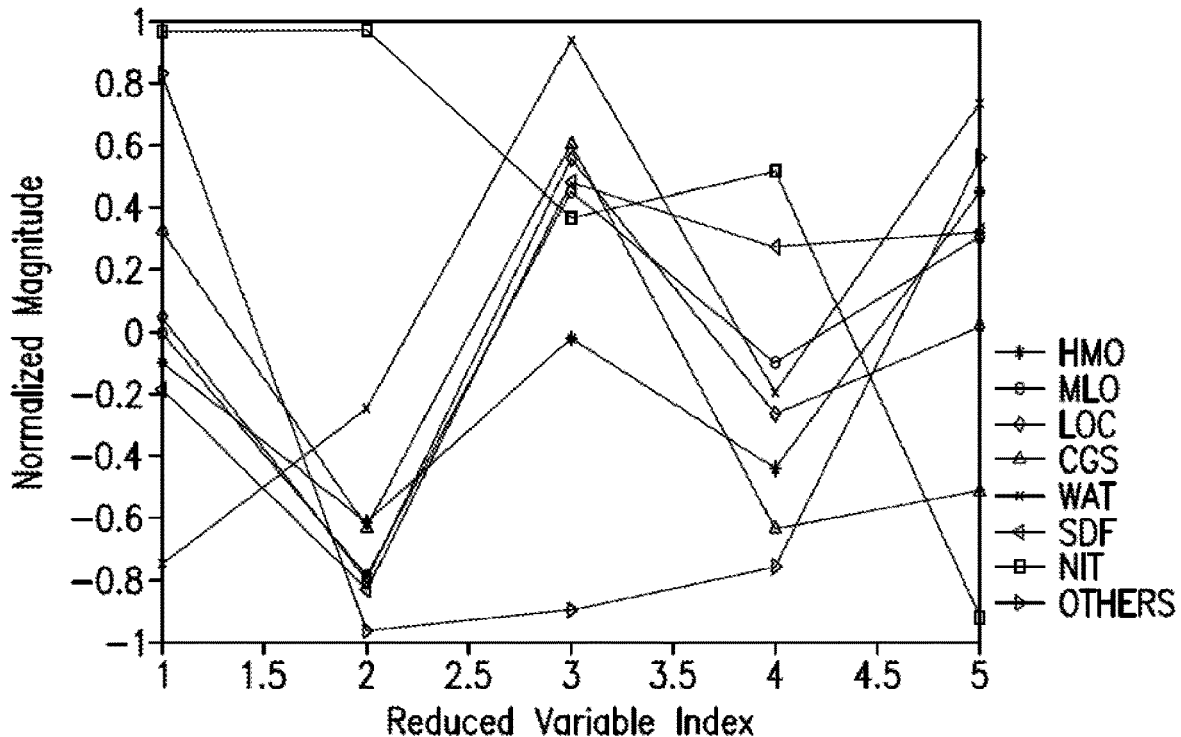
FIG. 7 is a plot graph of illustrative mean vectors for the different fluid types of FIG. 6 after reducing the number of clustering inputs from ten to five.

In one or more embodiments, the preliminary clustering results may be further refined by checking the consistency with fluid API gravity and gas-to-oil ratio (GOR) measurements, e.g., as stored in the fluid database, and merging semantically similar features or patterns into each fluid type of interest. The top five most effective clustering inputs (e.g., PSC1 to PSC4 and fluid density) having the highest fluid type sensitivity may be selected for pattern recognition applied during field operation, as shown in FIG. 7. In FIG. 7, a plot graph 700 of mean vectors is shown for the different fluid types of FIG. 6 after reducing the number of clustering inputs from ten to five.

In one or more embodiments, the fluid classifier or a fluid classification model thereof uses cluster mean supporting vectors to identify the one or more fluid types from the applied PSC data. For each cluster, the mean vector and sample standard deviation with respect to the sample-to-mean distance may be calculated and stored as fluid type supporting vectors. In one or more embodiments, the resulting cluster mean supporting vectors for the one or more fluid types may be representative patterns of the clusters generated by clustering the PSC data based on feature similarity and dissimilarity in measured distances within and between corresponding fluid types.

Figure 8:
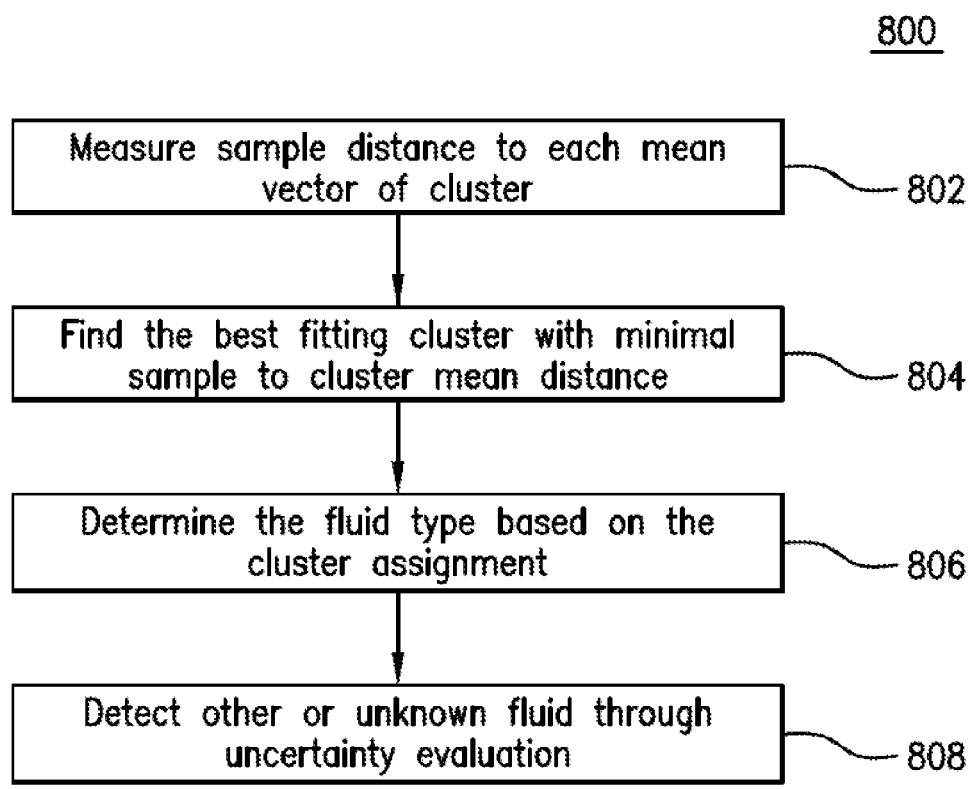
FIG. 8 is a flowchart of an illustrative process of unsupervised clustering for fluid classification based on PSC data.

FIG. 8 is a flowchart of an illustrative process 800 of using cluster mean supporting vectors for fluid classification based on PSC data. Process 800 may be performed by, for example, fluid classifier 104 of FIG. 1A, as described above. In block 802, a sample distance to each mean vector is measured. In block 804, the best fitting cluster with minimal distance is found. In block 806, the fluid type is determined based on cluster assignment. In block 808, unknown fluids and other fluids (e.g., mud) are detected by evaluating uncertainty or determining that the measured distance to the nearest neighbor cluster is significantly larger than the sample standard deviation of that cluster in the fluid database.

Referring back to process 200 of FIG. 2, the fluid classification in block 206 may be performed using an ANFIS model as an alternative to unsupervised clustering, as described above. An example of applying such an ANFIS model for fluid classification will now be described with respect to FIGS. 9-11. While unsupervised clustering allows for a fluid type or cluster to be assigned a random integer number (e.g., between 1-30, as in the example of FIG. 5 described above), the numbers that can be assigned as training targets to fluid types for supervised learning need to minimize standard error of calibration. In one or more embodiments, a target number of 1 may be assigned to NIT and then, incremented for additional fluid types or fluid patterns, as the fluid density associated with each additional fluid type increases. For example, a target number's of 2 may be assigned for CGS, 3 for LOC, 4 for MLO, 5 for SDF, 6 for HMO, 7 for WAT, and 8 for OTHERS (e.g., mud). Supervised machine learning may be used to refine these target numbers based on additional fluid composition and property information stored within an optical-PVT database, as described above. Such target numbers may then be used for training the ANFIS model, as will be described below with respect to FIG. 9.

Figure 9:
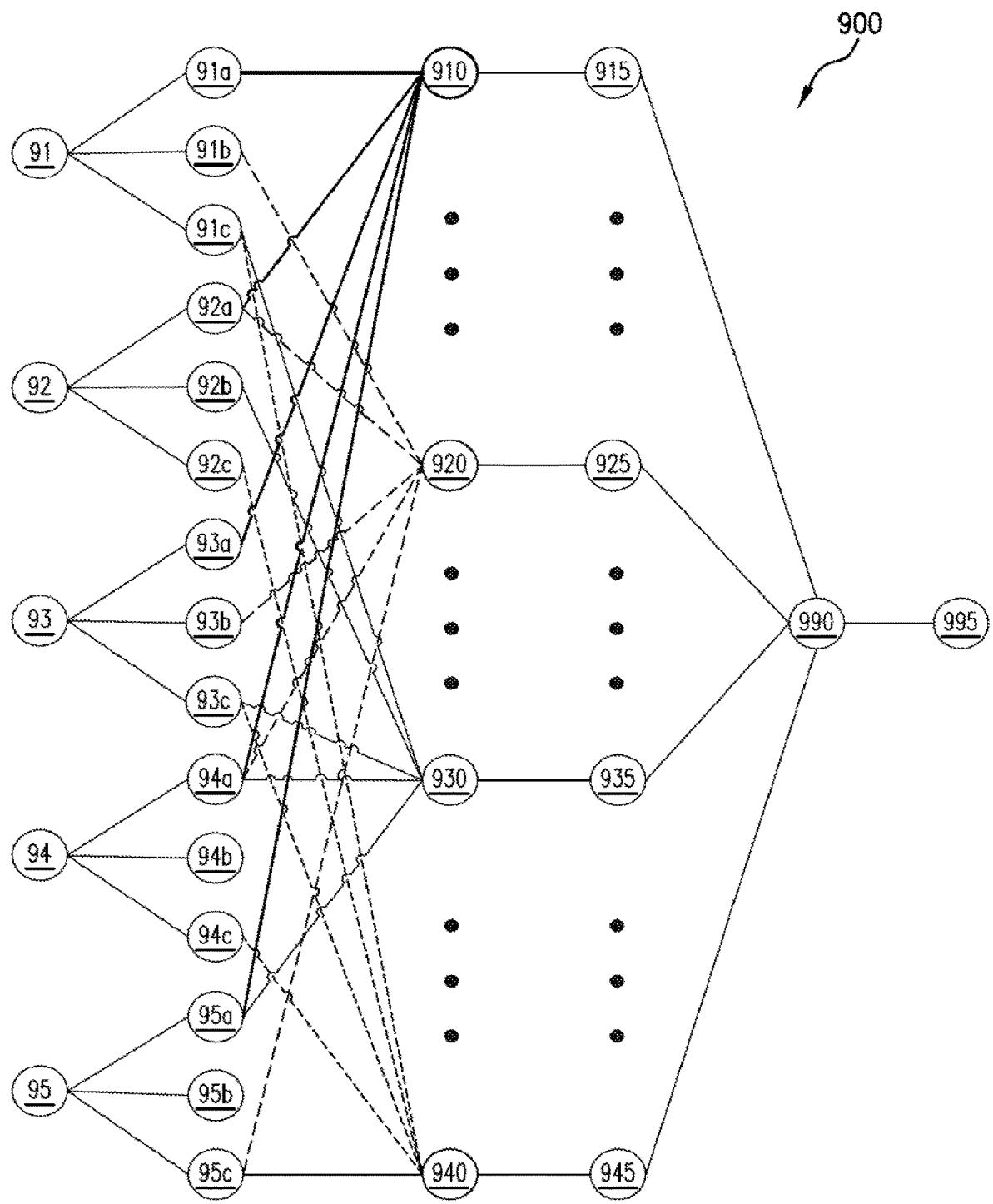
FIG. 9 is a diagram of an illustrative structure of an ANFIS model with five inputs and a single output.

FIG. 9 is a diagram of an illustrative structure for an ANFIS model 900 with five inputs and a single output. As shown in FIG. 9, ANFIS model 900 maps each of inputs 91, 92, 93, 94, and 95 to three input membership functions (MFs), as will be described in further detail below. The example combination of membership functions for each input are mapped to rules 910, 920, 930, and 940. Rules 910, 920, 930, and 940 are mapped to output membership functions 915, 925, 935, and 945, respectively. While only rules 910, 920, 930, and 940 and output member-ship functions 915, 925, 935, and 945 are shown in FIG. 9, it should be appreciated that embodiments are not limited thereto, and that additional rules and output membership functions may be used as desired for a particular implementation. Output membership functions 915, 925, 935, and 945 in this example are in turn mapped to a single aggregated output 990 or a defuzzified output 995. Through training, validation and testing data sets, ANFIS model 900 can learn from data with membership function parameters adjusted using a back propagation algorithm in combination with a least squares type of method to minimize the calibration error.

Each of inputs 91, 92, 93, 94, and 95 of ANFIS model 900 may represent an input parameter within a PSC parameter space that relates to a fluid property that can be measured by a fluid sensor (e.g., optical sensors 52 and a fluid density sensor of downhole tool 100 of FIGS. 1A and 1B, as described above) or found in a database (e.g., the optical-PVT database, as described above). For example, in FIG. 9, inputs 91, 92, 93, and 94 may represent four-PSC input parameters (PSC1, PSC2, PSC3, and PSC4) and input 95 may represent a fluid density input parameter. Three membership functions are selected for each of inputs 91, 92, 93, 94, and 95 to define low, medium, and high linguistic variables. For example, input 91 is mapped to membership functions 91$a$, 91$b$, and 91$c$. Input 92 is mapped to membership functions 92$a$, 92$b$, and 92$c$. Input 93 is mapped to membership functions 93$a$, 93$b$, and 93$c$. Input 94 is mapped to membership functions 94$a$, 94$b$, and 94$c$. Input 95 is mapped to membership functions 95$a$, 95$b$, and 95$c$. The "a," "b," and "c" membership functions for each input may define linguistic low, medium, and high, respectively. While each input is mapped to three membership functions in this example, embodiments are not intended to be limited thereto and each input may be mapped to any number of membership functions as desired for a particular implementation. For an input variable x, the membership function $\mu(x)$ with a maximum degree equal to 1 and a minimum degree equal to 0, also called "fuzzy input sets," can be calculated using Equation (3):

$$\mu(x) = \frac{1}{1 + |(x-c)/a|^{2b}} \quad (3)$$

where a, b, and c may be non-linear parameters.

In FIG. 9, there are 15 nodes representing all of the membership functions for inputs 91-95. The number of non-linear parameters of a, b, and c in Equation (3) above for membership functions can be 45, which can also be optimized through training.

Figure 10A:
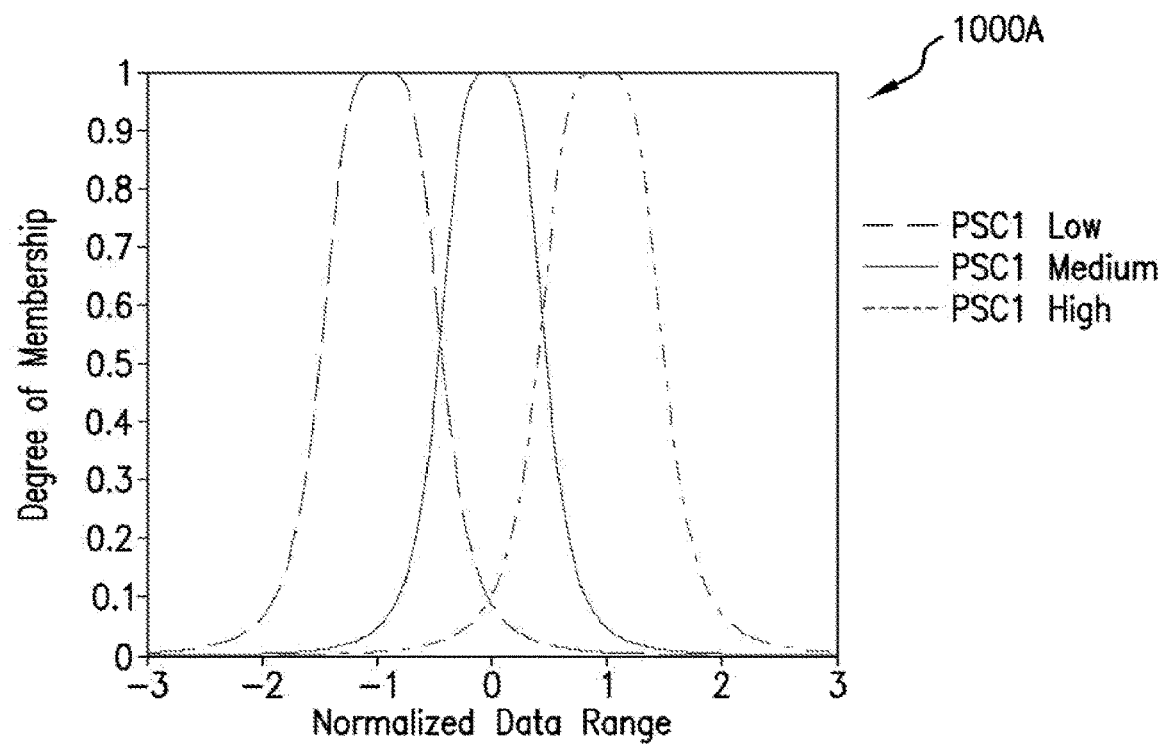
FIGS. 10A and 10B are plot graphs of illustrative membership functions for a first PSC input (PSC1) and a fluid density input of the ANFIS model of FIG. 9, respectively.
Figure 10B:
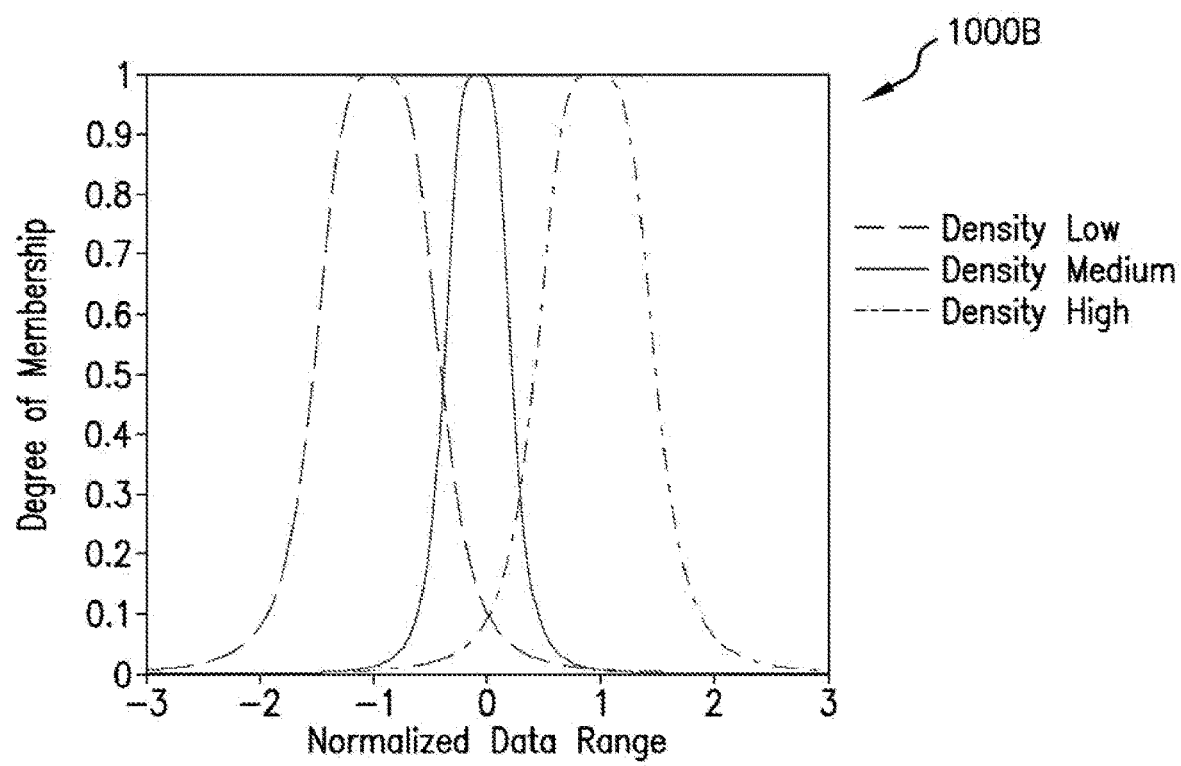

FIGS. 10A and 10B are exemplary graphs 1000A and 1000B showing three resulting membership functions for PSC 1 (e.g., input 91) and density (input 95), respectively. The normalized effective data range in this example is from −1 to 1. While this example utilizes bell-shaped membership functions, in other examples, other membership functions can be used, for example, Gaussian curve membership functions, triangular membership functions, or any other suitable membership functions. For an ANFIS model structure of 5 inputs with 3 membership functions for each input, there are a total of $3^5$, or 243, different combinations of fuzzy sets which can be coded as antecedent to build fuzzy rules. For example, code [2 1 2 1 3] may represent the antecedent or "if statement" of rule 920 of ANFIS model 900 in FIG. 9, which may be interpreted as follows: if (input 91 is MF 91b) and (input 92 is MF 92a) and (input 93 is MF 93b) and (input 94 is MF 94a) and (input 95 is MF 95c). Thus, if a medium PSC1, low PSC2, medium PSC3, low PSC4, and high fluid density are all true with a high degree of certainty, code [2 1 2 1 3] may indicate heavy and medium oil (HMO), which relates to rule 920. In another example, code [3 2 3 1 1] represents the antecedent or if statement of rule 930 of ANFIS model 900, which may be interpreted as follows: if (input 91 is MF 91c) and (input 92 is MF 92b) and (input 93 is MF 93c) and (input 94 is MF 94a) and (input 95 is MF 95a). In other words, if a high PSC1, medium PSC2, high PSC3, low PSC4, and low fluid density are all true with a high degree of certainty, code [3 2 3 1 1] may indicate the presence of gas or gas condensates, which relates to rule 930.

The consequence or "then statement" of rules 920 and rule 930 may be the output membership function (output MF) corresponding to the same rule number, i.e., output MF 925 and output MF 935 of ANFIS model 900, respectively, as shown in FIG. 9. Tins may be a linear combination of inputs calculated using, for example, Equations (4) and (5) as follows:

$$f_{920}=g_{920}\times \text{Input}91+h_{920}\times \text{Input}92+k_{920}\times \text{Input}93+ p_{920}\times \text{Input}94+q_{920}\times \text{Input}95+r_{920} \quad (4)$$

$$f_{930}=g_{930}\times \text{Input}91+h_{930}\times \text{Input}92+k_{930}\times \text{Input}93+ p_{930}\times \text{Input}94+q_{930}\times \text{Input}95+r_{930} \quad (5)$$

In Equations (4) and (5) above, the six parameters g, h, k, p, q, and r for each rule can be optimized through training. In this example, there are 1458 (243×6) possible linear parameters. There may be a total number of 1503 overall parameters, including both nonlinear and linear parameters, which may be implemented in a processor after ANFIS model 900 is built.

The aggregated output 990 of ANFIS model 900 in FIG. 9 may be calculated as $\sum_{i=1}^{243} w_i f_i$, where $w_i$ may be calculated using Equation (6) below:

$$w_i=\mu_{Ai}(\text{Input}91)\times\mu_{Bi}(\text{Input}92)\times\mu_{Ci}(\text{Input}93)\times\mu_{Di}(\text{Input}94)\times\mu_{Ei}(\text{Input}95) \quad (6)$$

where $\mu_{Ai}$, $\mu_{Bi}$, $\mu_{Ci}$, $\mu_{Di}$ and $\mu_{Ei}$ are degree of membership for Inputs 91, 92, 93, 94, and 95, respectively, dependent to the antecedent of each rule. The defuzzified output 995 of ANFIS model 900 in FIG. 9 is a weighted average, e.g., as expressed by Equation (7) below:

$$\text{Output} = \frac{\sum_{i=1}^{243} w_i f_i}{\sum_{i=1}^{243} w_i} \quad (7)$$

In FIG. 9, rules 910, 920, 930, and 940 may represent fuzzy rules that are antecedent dependent, where no rule is shared with more than one antecedent. Some antecedents, e.g., rule 940, where all inputs 91-95 have high MFs (91c, 92c, 93c, 94c, and 95c), will have a very low degree in Equation (7) and therefore, will have little contribution to the defuzzified output 995. In one or more embodiments, ANFIS model 900 may be used for modeling nonlinear systems by interpolating multiple linear models. However, in order to improve the generalization capability of the model, it may be important to have a larger number of training data points than the number of parameters to be estimated.

Figure 11:
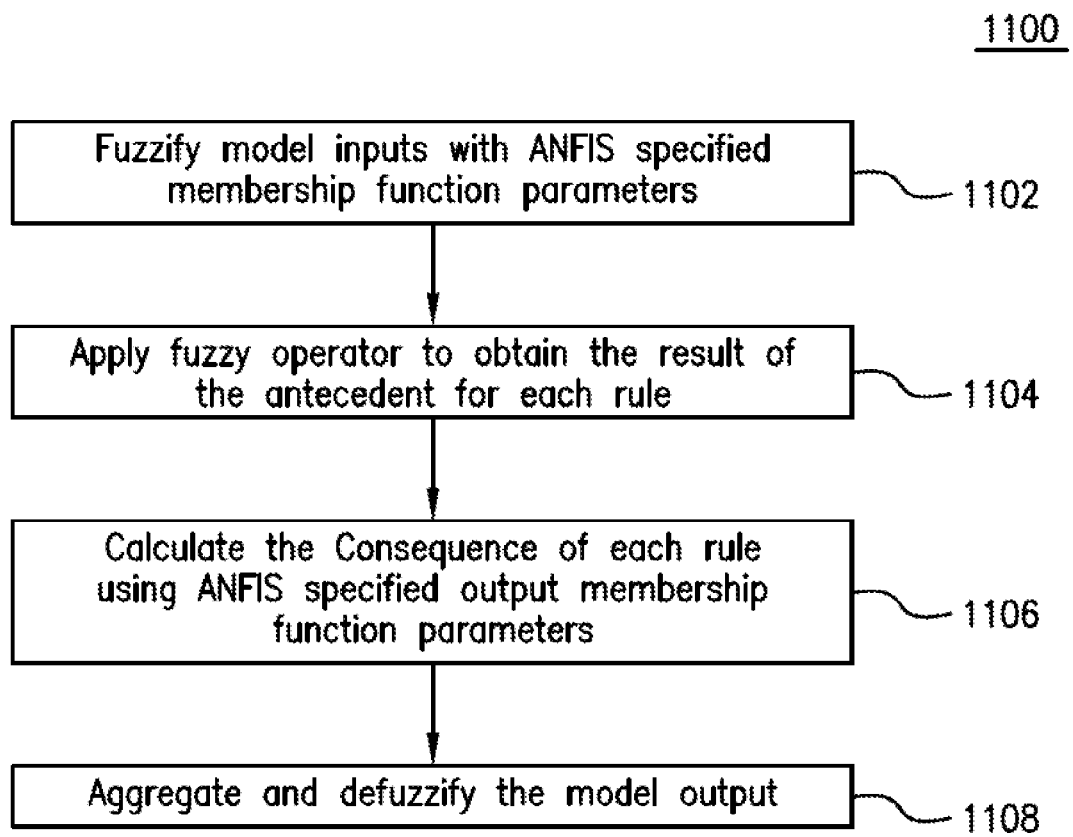
FIG. 11 is a flowchart of an illustrative process for downhole fluid classification using an adaptive neuro-fuzzy inference system (ANFIS) model.

FIG. 11 is a flowchart of a process 1100 for fluid classification using a calibrated ANFIS model. In block 1102, model inputs are fuzzified using calibrated membership function parameters. Although bell-shaped membership functions were used in the example described above with respect to FIGS. 10A and 10B, it should be appreciated that other types of membership functions, e.g., Gaussian curve or triangular membership functions, may also be used for training the ANFIS model.

In block 1104, fuzzy operators are applied to obtain the results of the antecedent for each rule. As in Equation (6) above, the antecedent for each rule may be a product of degrees of membership of multiple inputs. Equation (6) may also be replaced with a minimum ("MIN") operator for training the ANFIS model with a minimum degree of membership as the result of the antecedent for each rule. In block 1106, the consequence of each rule using the ANFIS model specified output membership function parameters are calculated, e.g., using Equations (4) and (5) above. In block 1108, the output of the ANFIS model is aggregated and defuzzified, e.g., using Equation (7) above. The ANFIS model output may also be rounded to its nearest fluid type integer.

Referring back to FIG. 2, once the one or more fluid types have been identified in block 206 using either unsupervised clustering (e.g., process 800 of FIG. 8, as described above) or supervised learning with an ANFIS model (e.g., process 1100 of FIG. 11, as described above), process 200 proceeds to block 208. In block 208, the fluid classifier used to perform the fluid classification for the current section of the wellbore is refined for one or more subsequent sections of the wellbore within the subsurface formation, based on the one or more fluid types identified for the current section of the wellbore.

In one or more embodiments, the identified fluid types may be used to refine a compositional fluid model selected for purposes of quantitative oil and gas characterization. The results of fluid typing may also be used to identify complex or unknown fluids including, for example, multi-phase fluid, fluid mixtures or emulsion fluids. Such fluids are usually not included in standard spectroscopy fluid databases. Once the optical signatures of complex fluids are identified through NN conversion, the new PSC data may be used in conjunction with existing PSC data to modify the current fluid classification model by including the additional fluid types identified using the transformed PSC data as training inputs.

Figure 12A:
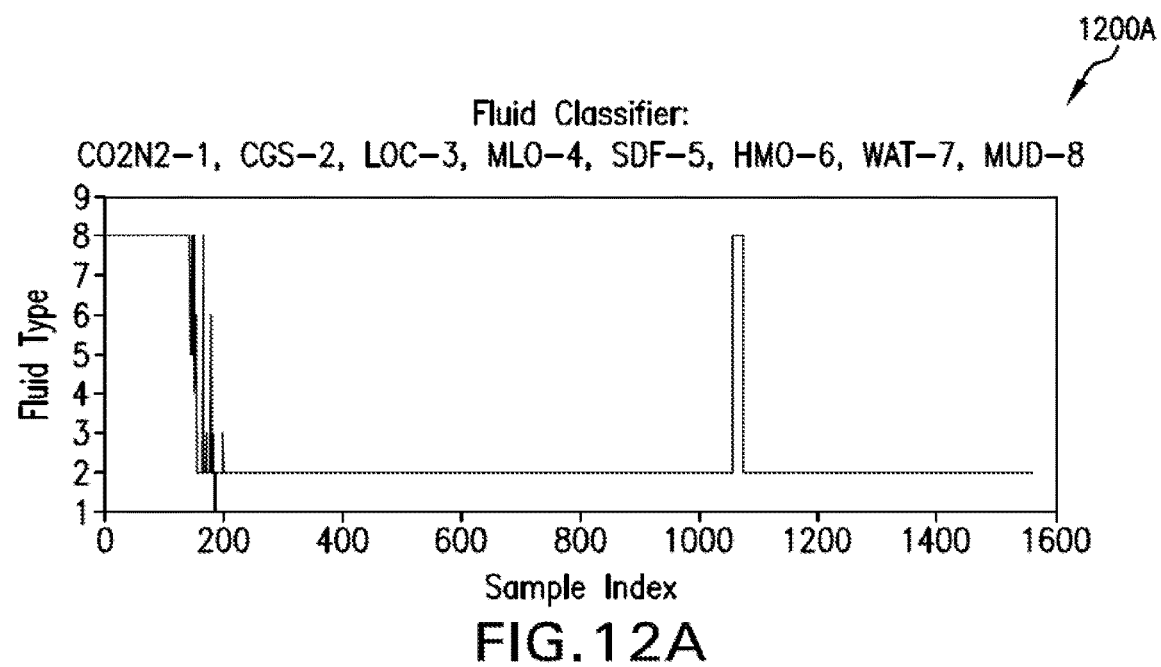
FIG. 12A is a plot graph of illustrative fluid types that were classified based on pump-out formation testing at different depths downhole.
Figure 12B:
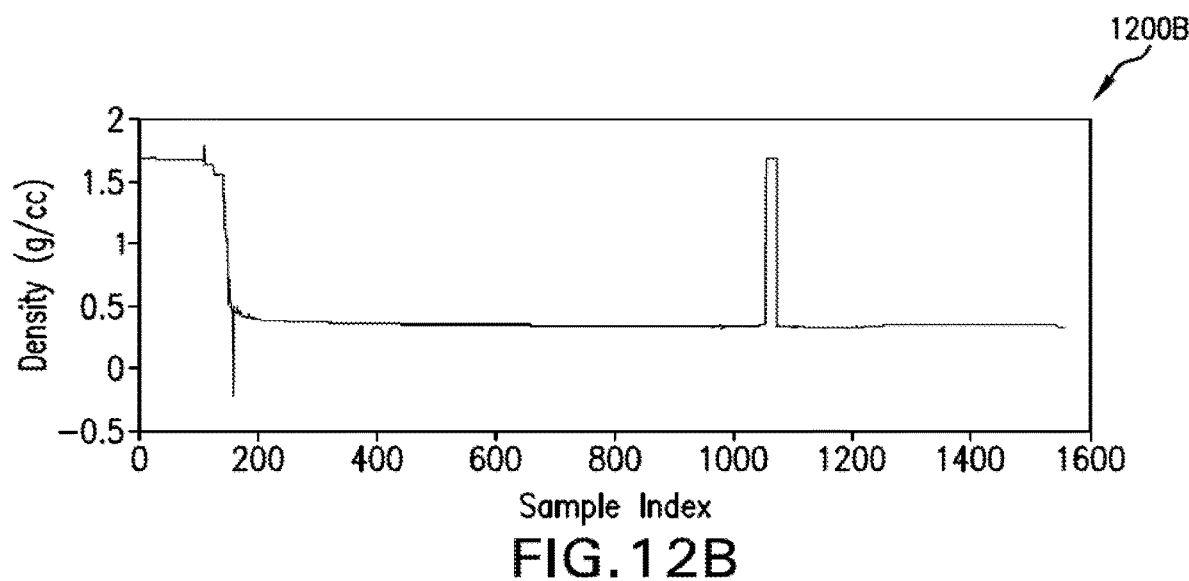
FIG. 12B is a plot graph of reference fluid density during the pump-out formation testing of FIG. 12A.
Figure 13A:
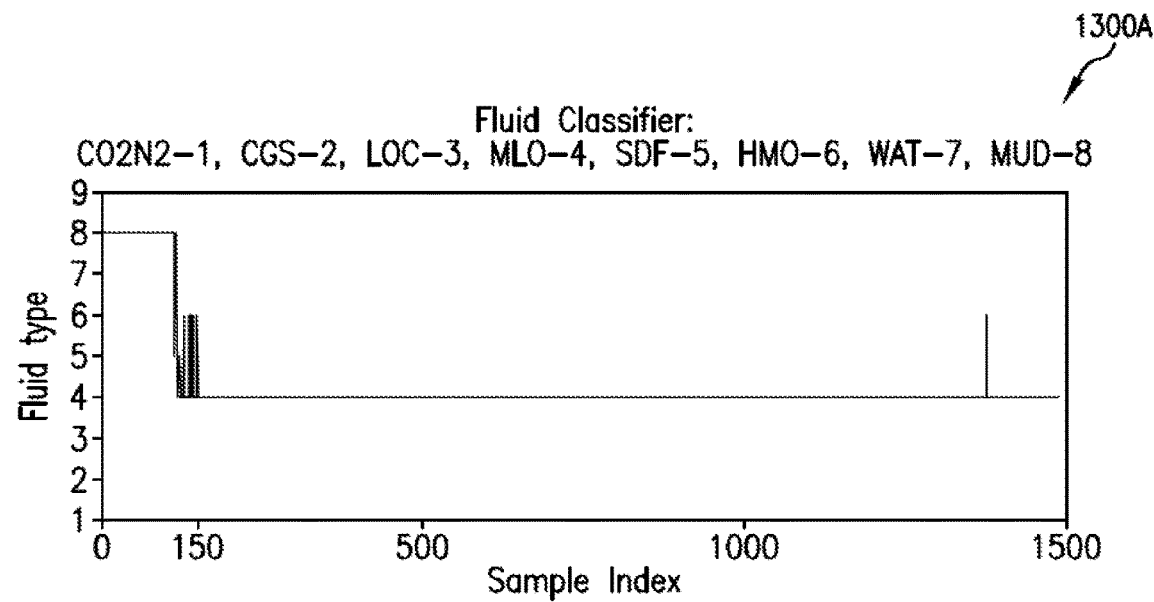
FIG. 13A is a plot graph of additional fluid types that were classified based on the pump-out formation testing at a single depth.
Figure 13B:
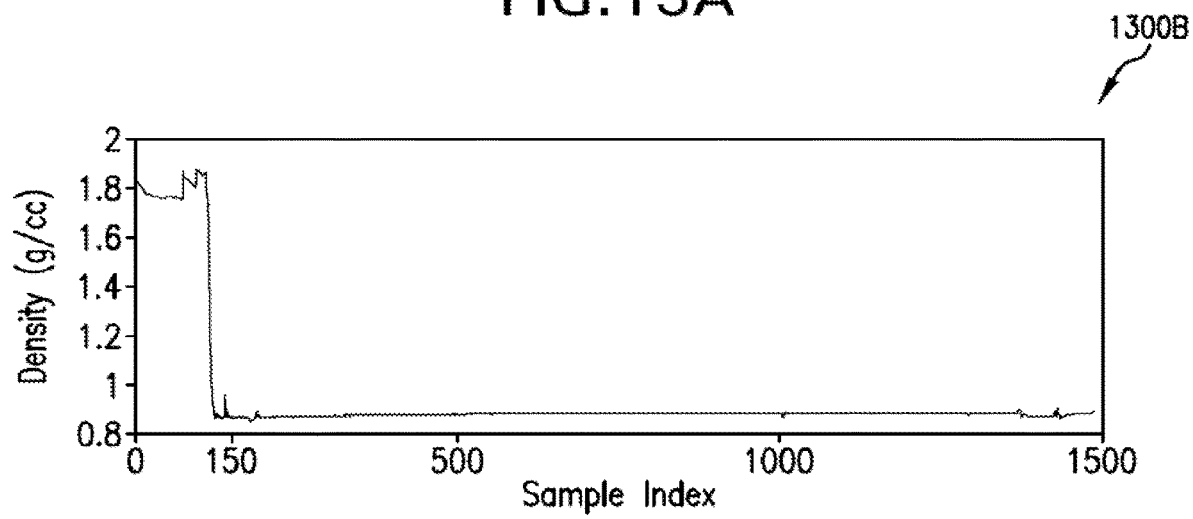
FIG. 13B is a plot graph of reference fluid density during the pump-out formation testing of FIG. 13A.

FIGS. 12A-B and FIGS. 13A-B show illustrative fluid classifier outputs and measured reference fluid density resulting from formation testing and sampling operations. During the field operation, the measurement data are usually collected along with fluid pump-out, which usually starts with mud filtrate and gradually turns to clean fluid, depending on the formation tester structure, the operational parameters or sampling strategy. FIG. 12A is a plot graph 1200A showing examples of fluid classifier outputs of pump-out formation testing at two depths. One set of measurements, e.g., the first 1050 measurements, may be collected at the first depth, and the rest of the measurements may be collected at the second depth. At each depth, the fluid pump-outs may be classified as mud filtrate (fluid type 8), then as condensates or gas (fluid type 2) over a longer testing period. FIG. 12B is a plot graph 1200B showing a reference fluid density measured by a density sensor during the same testing period as in FIG. 12A, indicating good agreement with fluid types. FIGS. 13A and 13B are plot graphs 1300A and 1300B, respectively, which show another formation testing example at a single depth. The pump-out of the first 125 measurements in this example may be classified as mud, and the measurements after sample index point 150 may be classified as medium or light oils, as shown in FIG. 13A. Similarly, the measured reference fluid density data, as shown in FIG. 13B, are also consistent with fluid types.

Figure 14:
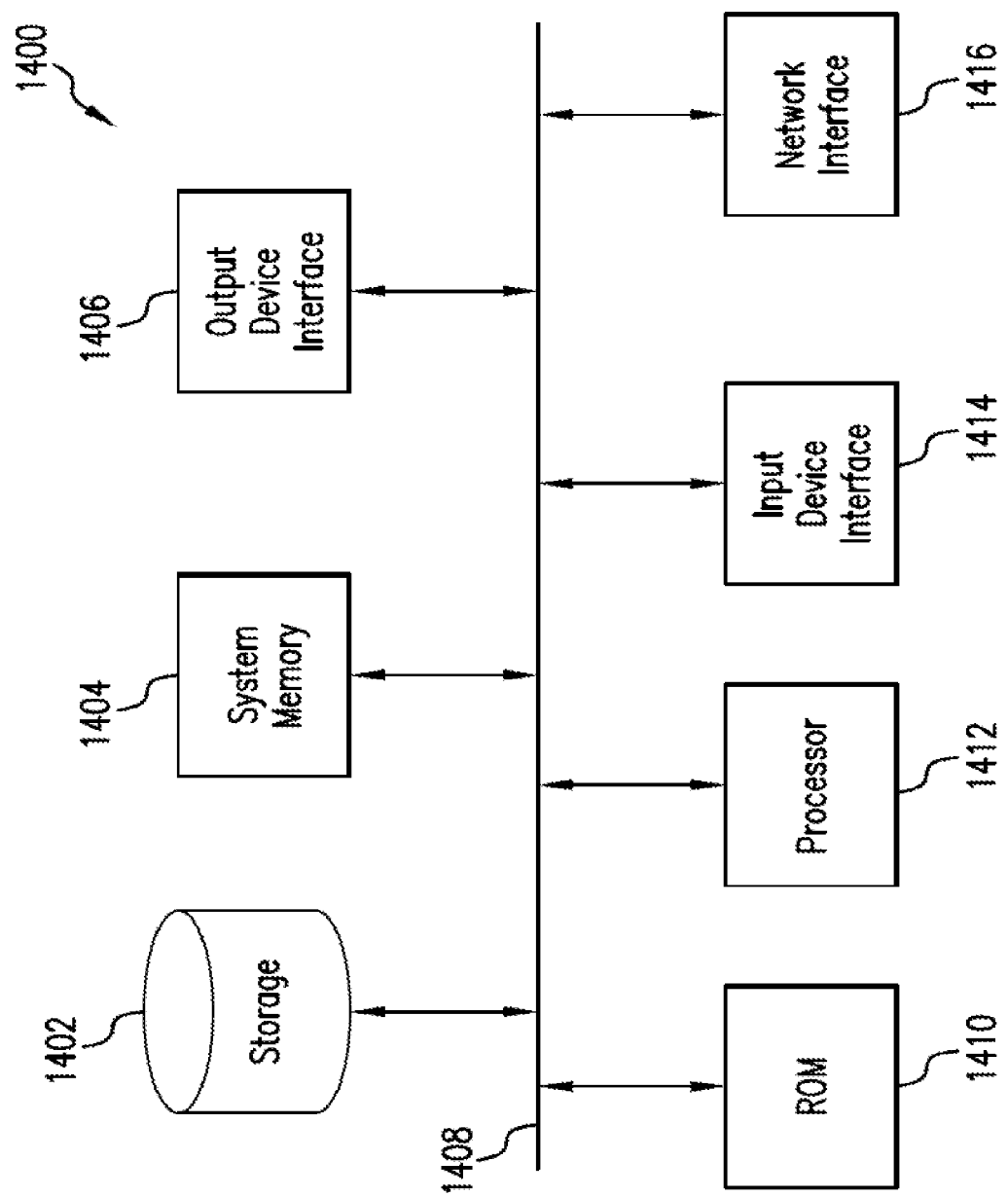
FIG. 14 is a block diagram of an illustrative computer system in which embodiments of the present disclosure may be implemented.

FIG. 14 is a block diagram of an exemplary computer system 1400 in which embodiments of the present disclosure may be implemented. For example, processes 200, 800, and 1100 of FIGS. 2, 8, and 11, respectively, as described above, may be implemented using system 1400. System 1400 can be a computer, phone, PDA, or any other type of electronic device. In some implementations, such an electronic device may be specially adapted to function as a downhole tool, e.g., downhole tool 100 of FIGS. 1A and 1B, as described above, or component thereof. Such an electronic device includes various types of computer readable media and interfaces for various other types of computer readable media. As shown in FIG. 14, system 1400 includes a permanent storage device 1402, a system memory 1404, an output device interface 1406, a system communications bus 1408, a read-only memory (ROM) 1410, processing unit(s) 1412, an input device interface 1414, and a network interface 1416.

Bus 1408 collectively represents all system, peripheral, and chipset buses that communicatively connect the numerous internal devices of system 1400. For instance, bus 1408 communicatively connects processing unit(s) 1412 with ROM 1410, system memory 1404, and permanent storage device 1402.

From these various memory units, processing unit(s) 1412 retrieves instructions to execute and data to process in order to execute the processes of the subject disclosure. The processing unit(s) can be a single processor or a multi-core processor in different implementations.

ROM 1410 stores static data and instructions that are needed by processing unit(s) 1412 and other modules of system 1400. Permanent storage device 1402, on the other hand, is a read-and-write memory device. This device is a non-volatile memory unit that stores instructions and data even when system 1400 is off. Some implementations of the subject disclosure use a mass-storage device (such as a magnetic or optical disk and its corresponding disk drive) as permanent storage device 1402.

Other implementations use a removable storage device (such as a floppy disk, flash drive, and its corresponding disk drive) as permanent storage device 1402. Like permanent storage device 1402, system memory 1404 is a read-and-write memory device. However, unlike storage device 1402, system memory 1404 is a volatile read-and-write memory, such a random access memory. System memory 1404 stores some of the instructions and data that the processor needs at runtime. In some implementations, the processes of the subject disclosure are stored in system memory 1404, permanent storage device 1402, and/or ROM 1410. For example, the various memory units include instructions for computer aided pipe string design based on existing string designs in accordance with some implementations. From these various memory units, processing unit(s) 1412 retrieves instructions to execute and data to process in order to execute the processes of some implementations.

Bus 1408 also connects to input and output device interfaces 1414 and 1406. Input, device interface 1414 enables the user to communicate information and select commands to the system 1400. Input devices used with input device interface 1414 include, for example, alphanumeric, QWERTY, or T9 keyboards, microphones, and pointing devices (also called "cursor control devices"). Output device interfaces 1406 enables, for example, the display of images generated by the system 1400. Output devices used with output device interface 1406 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 14, bus 1408 also couples system 1400 to a public or private network (not shown) or combination of networks through a network interface 1416. Such a network may include, for example, a local area network ("LAN"), such as an Intranet, or a wide area network ("WAN"), such as the Internet. Any or all components of system 1400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 200, 800, and 1100 of FIGS. 2, 8, and 11, respectively, as described above, may be implemented using system 1400 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs miming on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for robust fluid type classification based on the intrinsic nature of formation fluids represented by PSC inputs which are independent of sensor and data type. Accordingly, advantages of the present disclosure may include providing a capability for migrating historical data obtained from different downhole optical tools in diverse oil fields and then, integrating this data with laboratory data into a single generic database for extended applications. By minimizing the number optical inputs that are needed and also, incorporating non-optical inputs, such as fluid density, bubble point and compressibility, for both unsupervised and supervised data analysis and modeling, the disclosed techniques allow fluid classification to be simplified and more efficient for improved, more robust real-time decision making during downhole operations.

Embodiments of the present disclosure include a method for downhole fluid classification includes: obtaining measurements from one or more downhole sensors located along a current section of wellbore within a subsurface formation; transforming the measurements obtained from the one or more downhole sensors into principal spectroscopy component (PSC) data; identifying one or more fluid types for the current section of the wellbore within the subsurface formation, based on the PSC data and a fluid classification model; and refining the fluid classification model for one or more subsequent sections of the wellbore within the subsurface formation, based at least partly on the one or more fluid types identified for the current section of the wellbore. Further, a computer-readable storage medium with instructions stored therein has been described, where the instructions when executed by a computer cause the computer to perform a plurality of functions, including functions to: obtain measurements from one or more downhole sensors located along a current section of wellbore within a subsurface formation; transform the measurements obtained from the one or more downhole sensors into principal spectroscopy component (PSC) data; identify one or more fluid types for the current section of the wellbore within the subsurface formation, based on the PSC data and a fluid classification model; and refine the fluid classification model for one or more subsequent sections of the wellbore within the subsurface formation, based at least partly on the one or more fluid types identified for the current section of the wellbore.

In one or more of the foregoing embodiments, the one or more downhole sensors may include one or more optical sensors and one or more non-optical sensors disposed within the wellbore. For example, the one or more downhole sensors may be components of a downhole fluid analysis tool disposed within the wellbore. The one or more downhole sensors may include at least one optical sensor having an integrated computational element (ICE) for measuring one or more fluid properties. The non-optical sensors may include a fluid density sensor for measuring downhole fluid density. Additional non-optical sensors may be included for measuring bubble point and fluid compressibility. The PSC data may be applied as an input to the fluid classification model, and the one or more fluid types are identified based on the applied PSC data. The fluid classification model may be an adaptive neuro-fuzzy inference system (ANFIS) model used to identify the one or more fluid types from the applied PSC data. Alternatively, the fluid classification model may use cluster mean supporting vectors to identity the one or more fluid types from the applied PSC data. The cluster mean supporting vectors for the one or more fluid types may be representative fluid patterns generated by clustering the PSC data based on measured distances between features of corresponding fluid types. The clustering may be based on a hierarchical free of fluid type clusters. The clustering may be based on a self-organized-feature-map (SOFM) of fluid type clusters. The one or more fluid types may be selected from the group consisting of: heavy and medium oil; medium and light oil: light oil and condensates; condensates and gas: water; synthetic drilling fluid; and mud filtrate. The transformation of the measurements obtained from the one or more downhole sensors may be performed using a neural network converter including one or more neural networks. The neural network based transformation may be calibrated on reference fluids with optical sensor measurement data and laboratory measurements as inputs and PSC data as outputs.

Embodiments of the present disclosure further include a system, which includes at least one processor and a memory coupled to the processor that has instructions stored therein, which when executed by the processor, cause the processor to perform functions, including functions to: obtain measurements from one or more downhole sensors located along a current section of wellbore within a subsurface formation; transform the measurements obtained from the one or more downhole sensors into principal spectroscopy component (PSC) data; identify one or more fluid types for the current section of the wellbore within the subsurface formation, based on the PSC data and a fluid classification model; and refine the fluid classification model for one or more subsequent sections of the wellbore within the subsurface formation, based at least partly on the one or more fluid types identified for the current section of the wellbore.

In one or more embodiments of the foregoing system, the one or more downhole sensors may include one or more optical sensors and one or more non-optical sensors disposed within the wellbore. For example, the one or more downhole sensors may be components of a downhole fluid analysis tool disposed within the wellbore. The one or more downhole sensors may include at least one optical sensor having an integrated computational element (ICE) for measuring one or more fluid properties. The non-optical sensors may include a fluid density sensor for measuring downhole fluid density. Additional non-optical sensors may be included for measuring bubble point and fluid compressibility. The PSC data may be applied as an input to the fluid classification model, and the one or more fluid types are identified based on the applied PSC data. The Quid classification model may be an adaptive neuro-fuzzy inference system (ANFIS) model used to identify the one or more fluid types from the applied PSC data. Alternatively, the fluid classification model may use cluster mean supporting vectors to identify the one or more fluid types from the applied PSC data. The cluster mean supporting vectors for the one or more fluid types may be representative fluid patterns generated by clustering the PSC data based on measured distances between features of corresponding fluid types. The clustering may be based on a hierarchical tree of fluid type clusters. The clustering may be based on a self-organized-feature-map (SOFM) of fluid type clusters. The one or more fluid types may be selected from the group consisting of: heavy and medium oil; medium and light oil; light oil and condensates; condensates and gas; water; synthetic drilling fluid; and mud filtrate. The transformation of the measurements obtained from the one or more downhole sensors may be performed using a neural network converter including one or more neural networks. The neural network based transformation may be calibrated on reference fluids with optical sensor measurement data and laboratory measurements as inputs and PSC data as outputs.

While specific details about the above embodiments have been described, the above hardware and software descriptions are intended merely as example embodiments and are not intended to limit the structure or implementation of the disclosed embodiments. For instance, although many other internal components of the system 1400 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of downhole fluid classification, the method comprising:
    obtaining, from one or more downhole sensors located along a current section of a wellbore within a subsurface formation, measurements of fluid characteristics for the current section of the wellbore;
    transforming the obtained measurements from a sensor parameter space associated with the one or more downhole sensors into a principal spectroscopy component (PSC) parameter space associated with a downhole fluid classifier;
    applying the transformed measurements as PSC input data to a fluid classification model of the downhole fluid classifier to identify one or more fluid types for the current section of the wellbore within the subsurface formation; and
    refining the fluid classification model for one or more subsequent sections of the wellbore within the subsurface formation, based at least partly on the one or more fluid types identified for the current section of the wellbore.

2. The method of claim 1, wherein the one or more downhole sensors are components of a downhole fluid analysis tool disposed within the wellbore.

3. The method of claim 1, wherein the one or more downhole sensors include at least one optical sensor having an integrated computational element (ICE) for measuring one or more fluid properties.

4. The method of claim 3, wherein the one or more fluid properties are selected from the group consisting of: hydrocarbon concentration; gas/oil ratio (GOR); saturates, aromatics, resins, and asphaltenes (SARA) concentration: CO2 concentration: H2O concentration; synthetic drilling fluid (SDF) concentration; and specific gravity.

5. The method of claim 1, wherein the fluid classification model is an adaptive neuro-fuzzy inference system (ANFIS) model used to identify the one or more fluid types from the applied PSC input data.

6. The method of claim 1, wherein the fluid classification model uses cluster mean supporting vectors to identify the one or more fluid types from the applied PSC input data.

7. The method of claim 6, wherein the cluster mean supporting vectors for the one or more fluid types are representative fluid patterns generated by clustering the PSC input data based on measured distances between features of corresponding fluid types.

8. The method of claim 7, wherein the clustering is based on a hierarchical tree of fluid type clusters.

9. The method of claim 7, wherein the clustering is based on a self-organized-feature-map (SOFM) of fluid type clusters.

10. The method of claim 1, wherein the one or more fluid types are selected from the group consisting of: heavy and medium oil; medium and light oil; light oil and condensates; condensates and gas; water; synthetic drilling fluid; and mud filtrate.

11. The method of claim 1, wherein transforming the measurements obtained from the one or more downhole sensors is performed using a neural network converter including one or more neural networks.

12. A system comprising:
    at least one processor; and
    a memory coupled to the processor having instructions stored therein, which when executed by the processor, cause the processor to perform functions including functions to:
    obtain, from one or more downhole sensors located along a current section of a wellbore within a subsurface formation, measurements of fluid characteristics for the current section of the wellbore;
    transform the obtained measurements from a sensor parameter space associated with the one or more downhole sensors into a principal spectroscopy component (PSC) parameter space associated with a downhole fluid classifier;
    apply the transformed measurements as PSC input data to a fluid classification model of the downhole fluid classifier to identify one or more fluid types for the current section of the wellbore within the subsurface formation; and
    refine the fluid classification model for one or more subsequent sections of the wellbore within the subsurface formation, based at least partly on the one or more fluid types identified for the current section of the wellbore.

13. The system of claim 12, wherein tire one or more downhole sensors include one or more optical sensors and one or more non-optical sensors disposed within the wellbore.

14. The system of claim 13, wherein the one or more optical sensors include at least one optical sensor having an integrated computational element (ICE) for measuring one or more fluid properties.

15. The system of claim 12, wherein the functions performed by the processor further include functions to:
    apply the PSC input data to an adaptive neuro-fuzzy inference system (ANFIS) model; and
    identify the one or more fluid types based on the applied PSC input data.

16. The system of claim 12, wherein the functions performed by the processor further include functions to:
    generate cluster mean supporting vectors based on the PSC, input data, the cluster mean supporting vectors representing fluid patterns generated by clustering the PSC input data based on measured distances between features of corresponding fluids types; and
    identify the one or more fluid types based on the generated cluster mean supporting vectors.

17. The system of claim 16, wherein the cluster mean supporting vectors are generated based on a hierarchical free of fluid type clusters.

18. The system of claim 12, wherein the one or more fluid types are selected from the group consisting of: heavy and medium oil; medium and light oil; light oil and condensates; condensates and gas; water; synthetic drilling fluid; and mud filtrate.

19. The system of claim 12, wherein the transformation of the measurements obtained from the one or more downhole sensors is performed using one or more neural networks.

20. A computer-readable storage medium having instructions stored therein, which when executed by a computer cause the computer to perform a plurality of functions, including functions to:

obtain, from one or more downhole sensors located along a current section of a wellbore within a subsurface formation, measurements of fluid characteristics for the current section of the wellbore:

transform the obtained measurements from a sensor parameter space associated with the one or more downhole sensor's into a principal spectroscopy component (PSC) parameter space associated with a downhole fluid classifier;

apply the transformed measurements as PSC input data to a fluid classification model of the downhole fluid classifier to identify one or more fluid types for the current section of the wellbore within the subsurface formation; and refine the fluid classification model for one or more subsequent sections of the wellbore within the subsurface formation, based at least partly on the one or more fluid types identified for the current section of the wellbore.

* * * * *

UNITED STATES PATENT AND TRADEMARK OFFICE
CERTIFICATE OF CORRECTION

PATENT NO. : 10,641,091 B2
APPLICATION NO. : 15/557049
DATED : May 5, 2020
INVENTOR(S) : Dingding Chen et al.

It is certified that error appears in the above-identified patent and that said Letters Patent is hereby corrected as shown below:

In the Specification

Column 2, Line 51 change "retelling" to -- referring --

Column 3, Line 53 change "chilling" to -- drilling --

Column 3, Line 55 change "towering" to -- lowering --

Column 4, Line 13 change "sensor's" to -- sensors --

Column 4, Line 40 change "oilier" to -- other --

Column 5, Line 21 change "Tins" to -- This --

Column 6, Line 24 change "ran" to -- run --

Column 6, Line 67 change "tabular" to -- tubular --

Column 7, Line 9 change "earning" to -- carrying --

Column 10, Line 38 change "number's" to -- numbers --

Column 11, Line 6 change "end" to -- and --

Column 11, Line 66 change "number's" to -- numbers --

Column 13, Line 14 change "$3^5$" to -- 35 --

Column 13, Line 40 change "Tins" to -- This --

Signed and Sealed this
Twentieth Day of October, 2020

Andrei Iancu
*Director of the United States Patent and Trademark Office*

CERTIFICATE OF CORRECTION (continued)
U.S. Pat. No. 10,641,091 B2

Column 17, Line 57 change "miming" to -- running --

Column 19, Line 14 change "identity" to -- identify --

Column 19, Line 20 change "free" to -- tree --

Column 19, Line 63 change "Quid" to -- fluid --

Column 21, Line 5 change "ail" to -- all --